(12) United States Patent
Murai et al.

(10) Patent No.: US 9,406,958 B2
(45) Date of Patent: Aug. 2, 2016

(54) ELECTROLYTE EMULSION AND PROCESS FOR PRODUCING SAME

(71) Applicants: ASAHI KASEI KABUSHIKI KAISHA, Tokyo (JP); DAIKIN INDUSTRIES, LTD., Osaka-Shi, Osaka (JP)

(72) Inventors: Takahiko Murai, Tokyo (JP); Naoki Sakamoto, Tokyo (JP); Naoto Miyake, Tokyo (JP); Tadashi Ino, Settsu (JP); Masaharu Nakazawa, Settsu (JP); Noriyuki Shinoki, Settsu (JP); Takashi Yoshimura, Settsu (JP); Masahiro Kondo, Settsu (JP)

(73) Assignees: ASAHI KASEI KABUSHIKI KAISHA, Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/822,158

(22) Filed: Aug. 10, 2015

(65) Prior Publication Data
US 2015/0349366 A1 Dec. 3, 2015

Related U.S. Application Data

(62) Division of application No. 13/496,996, filed as application No. PCT/JP2010/066227 on Sep. 17, 2010, now Pat. No. 9,133,316.

(30) Foreign Application Priority Data

Sep. 18, 2009 (JP) .................. 2009-217693

(51) Int. Cl.
*H01M 8/10* (2016.01)
*C08J 5/22* (2006.01)
(Continued)

(52) U.S. Cl.
CPC ............... *H01M 8/1004* (2013.01); *C08F 6/16* (2013.01); *C08F 6/22* (2013.01); *C08F 8/12* (2013.01);
(Continued)

(58) Field of Classification Search
CPC ............ H01M 8/1039; H01M 8/1067; H01M 8/1025; H01M 8/1072; H01M 2300/0082; H01M 2008/1095
USPC .................................................. 429/309, 314
See application file for complete search history.

(56) References Cited

U.S. PATENT DOCUMENTS

| 4,940,525 A | 7/1990 | Ezzell et al. | |
| 6,559,237 B1 * | 5/2003 | Mao .......................... | C08F 8/36 521/27 |

(Continued)

FOREIGN PATENT DOCUMENTS

| EP | 0498076 A1 | 8/1992 |
| EP | 1535935 A1 | 6/2005 |

(Continued)

OTHER PUBLICATIONS

Communication dated Oct. 6, 2014, issued by the European Patent Office in corresponding European Application No. 10817292.5.
International Search Report for PCT/JP2010/066227, dated Dec. 7, 2010.

*Primary Examiner* — Mark F Huff
*Assistant Examiner* — Monique Wills
(74) *Attorney, Agent, or Firm* — Sughrue Mion, PLLC

(57) ABSTRACT

The present invention provides a fluoropolymer electrolyte material which has improved processability and which is easily produced. The electrolyte emulsion of the present invention comprises an aqueous medium and a fluoropolymer electrolyte dispersed in the aqueous medium. The fluoropolymer electrolyte has a monomer unit having an $SO_3Z$ group (Z is an alkali metal, an alkaline-earth metal, hydrogen, or $NR^1R^2R^3R^4$, and $R^1$, $R^2$, $R^3$, and $R^4$ each are individually a C1-C3 alkyl group or hydrogen). The fluoropolymer electrolyte has an equivalent weight (EW) of 250 or more and 700 or less and a proton conductivity at 110° C. and relative humidity 50% RH of 0.10 S/cm or higher. The fluoropolymer electrolyte is a spherical particulate substance having an average particle size of 10 to 500 nm. The fluoropolymer electrolyte has a ratio (the number of $SO_2F$ groups)/(the number of $SO_3Z$ groups) of 0 to 0.01.

8 Claims, 1 Drawing Sheet

(51) Int. Cl.

| | |
|---|---|
| *C08J 7/04* | (2006.01) |
| *H01B 1/12* | (2006.01) |
| *C08F 214/26* | (2006.01) |
| *C08F 8/12* | (2006.01) |
| *C08F 6/16* | (2006.01) |
| *C08F 6/22* | (2006.01) |
| *C08F 8/44* | (2006.01) |

(52) U.S. Cl.
CPC ............... *C08F 8/44* (2013.01); *C08F 214/262* (2013.01); *C08J 5/225* (2013.01); *C08J 7/04* (2013.01); *H01B 1/122* (2013.01); *H01M 8/1025* (2013.01); *H01M 8/1039* (2013.01); *H01M 8/1067* (2013.01); *H01M 8/1072* (2013.01); *C08F 2800/10* (2013.01); *C08F 2810/50* (2013.01); *C08J 2327/12* (2013.01); *H01M 2008/1095* (2013.01); *H01M 2250/10* (2013.01); *H01M 2250/20* (2013.01); *H01M 2250/30* (2013.01); *H01M 2300/0082* (2013.01); *Y02B 90/14* (2013.01); *Y02B 90/18* (2013.01); *Y02E 60/523* (2013.01); *Y02P 70/56* (2015.11); *Y02T 90/32* (2013.01)

(56) References Cited

U.S. PATENT DOCUMENTS

| | | | |
|---|---|---|---|
| 7,455,934 B1 * | 11/2008 | Araki | ..................... H01B 1/122 204/252 |
| 2003/0146148 A1 | 8/2003 | Wu et al. | |
| 2004/0242708 A1 | 12/2004 | Hasegawa et al. | |
| 2006/0194703 A1 | 8/2006 | Tatemoto et al. | |

FOREIGN PATENT DOCUMENTS

| | | |
|---|---|---|
| EP | 1589062 A2 | 10/2005 |
| EP | 2270818 A1 | 1/2011 |
| GB | 1210794 | 1/1969 |
| JP | 63-297406 A | 12/1988 |
| JP | 4-366137 A | 12/1992 |
| JP | 06-322034 A | 11/1994 |
| JP | 2002-352819 A | 12/2002 |
| JP | 2006-173098 A | 6/2006 |
| JP | 2007-109634 A | 4/2007 |
| WO | 99/59216 A1 | 11/1999 |
| WO | 02096983 A1 | 12/2002 |
| WO | 03050150 A1 | 6/2003 |
| WO | 03050151 A1 | 6/2003 |
| WO | 2004/078842 A1 | 9/2004 |
| WO | 2009/116446 A1 | 9/2009 |

\* cited by examiner

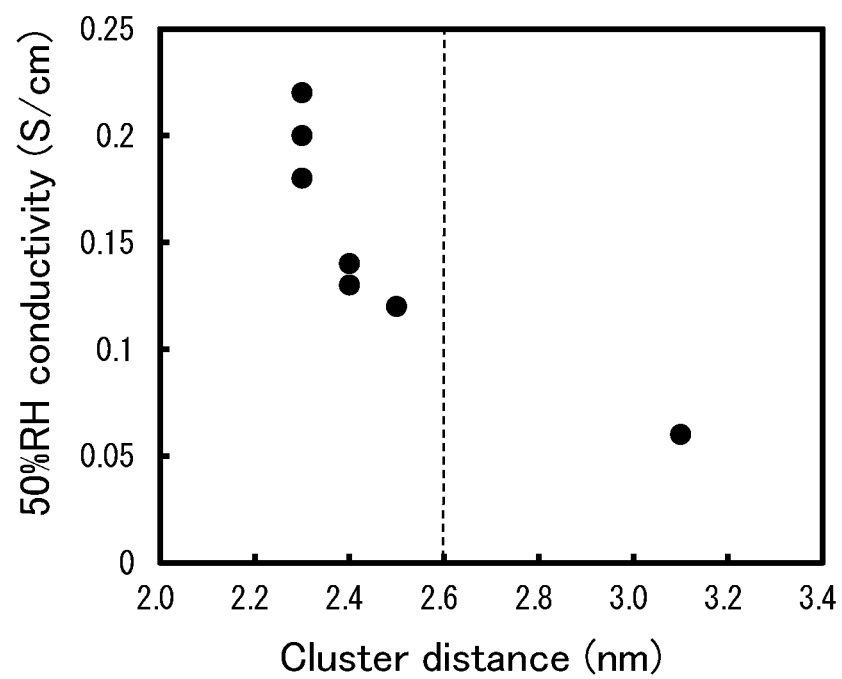

ELECTROLYTE EMULSION AND PROCESS FOR PRODUCING SAME

CROSS REFERENCE TO RELATED APPLICATIONS

This is a divisional of application Ser. No. 13/496,996 filed Mar. 27, 2012, which is a National Stage of International Application No. PCT/JP2010/066227 filed Sep. 17, 2010, claiming priority to Japanese Patent Application No. 2009-217693, filed Sep. 18, 2009, the contents of all of which are incorporated herein by reference in their entirety.

TECHNICAL FIELD

The present invention relates to an electrolyte emulsion which is suitable for, for example, electrolyte membranes for polymer electrolyte fuel cells, and a method for producing the same.

BACKGROUND ART

Fuel cells are cells directly converting chemical energy of fuels into electric energy by electrochemically oxidizing hydrogen, methanol, and the like in cells, and then extracting the electric energy. They are therefore focused on as clean electric energy sources. In particular, polymer electrolyte fuel cells can drive at temperatures lower than other cells, and they are expected as alternative power sources for automobiles, household cogeneration systems, portable electric generators, and the like.

Such a polymer electrolyte fuel cell comprises at least a membrane electrode assembly. The membrane electrode assembly comprises an electrolyte membrane and gas diffusion electrodes. Each gas diffusion electrode is formed by stacking an electrode catalyst layer and a gas diffusion layer, and the gas diffusion electrodes are joined to the respective faces of the electrolyte membrane. The electrolyte membrane herein is a material having a strong acid group such as a sulfonic acid group and a carboxylic acid group in a polymer chain, and having proton-selective permeability. Examples of such an electrolyte membrane include perfluoro proton exchange membranes typically such as Nafion (registered trademark, Du Pont) having high chemical stability.

In order to drive a fuel cell, a fuel (e.g. hydrogen) is supplied to a gas diffusion electrode on the anode side, while an oxidant (e.g. oxygen or air) is supplied to a gas diffusion electrode on the cathode side, and both of the electrodes are coupled through an outside circuit. Thereby, the fuel cell operates. Specifically, in the case that hydrogen is used as the fuel, hydrogen is oxidized and generates a proton on an anode catalyst. This proton passes through an electrolyte binder in the anode catalyst layer, moves inside the electrolyte membrane, and reaches on a cathode catalyst through the electrolyte binder inside the cathode catalyst layer. On the other hand, an electron generated at the same time of the proton by oxidation of hydrogen reaches the gas diffusion electrode on the cathode side through the outside circuit. On the cathode catalyst, the proton and oxygen in the oxidant react to generate water. At this time, electric energy is generated.

Since polymer electrolyte fuel cells show a high energy conversion rate with a small environmental burden, they are expected as stationary cogeneration systems and vehicle-mounted power sources. In the automobile applications, fuel cells are generally driven at around 80° C. at the present time. In order to popularize fuel-cell vehicles, however, downsizing of radiators and simplification of humidifiers, and resulting cost reduction are required. For this purpose, an electrolyte membrane is demanded which is capable of being applied to driving under high-temperature and low-humidity conditions (corresponding to a driving temperature of 100° C. to 120° C. and a humidity of 20 to 50% RH), and which shows high performance under wide driving environments (room temperature to 120° C./20 to 100% RH). Specifically, as shown in Non-Patent Document 1, the proton conductivity is required to be 0.10 S/cm or higher at 50% RH for a driving temperature of 100° C., and the proton conductivity is required to be 0.10 S/cm or higher at 20% RH for a driving temperature of 120° C.

The conductivity of a conventional perfluoro proton exchange membrane, however, greatly depends on humidity, and it greatly decreases particularly at 50% RH or lower. Patent Documents 1 to 3 disclose a fluoroelectrolyte membrane having an equivalent weight (EW), that is, EW (g/eq) which is a dried weight per equivalent of a proton exchange group, of 670 to 776. As mentioned here, a reduction in the EW value, in other words, an increase in the capacity of the proton exchange leads to an increase in the conductivity. Further, Patent Document 4 discloses an electrolyte membrane which is less likely to be hydrothermally dissolved even at a low EW, and exemplifies an electrolyte membrane with an EW of 698. Patent Document 5 discloses one example of a method for producing a polymer electrolyte with an EW of 564.

In addition, perfluoro proton exchange membranes are known to deteriorate due to long-term use, and various stabilizing methods are proposed. For example, Patent Document 6 discloses a fluoropolymer electrolyte obtained through a polymerization step in which materials are copolymerized at a polymerization temperature of 0° C. to 35° C. using a radical polymerization initiator that comprises a fluorocompound having a molecular weight of 450 or higher.

Patent Document 1: JP 06-322034 A
Patent Document 2: JP 04-366137 A
Patent Document 3: WO 2002/096983
Patent Document 4: JP 2002-352819 A
Patent Document 5: JP 63-297406 A
Patent Document 6: JP 2006-173098 A
Non-Patent Document 1: H. Gasteiger and M. Mathias, In Proton Conducting Membrane Fuel Cells, PV 2002-31, pp. 1-22, The Electrochemical Society Proceedings Series (2002)

SUMMARY OF THE INVENTION

Problems to be Solved by the Invention

However, each of the electrolyte membranes disclosed in Patent Documents 1 to 6 still has a low conductivity at 50% RH or lower; the conductivity is far from 0.10 S/cm.

The present inventors have found that use of a fluoroelectrolyte precursor polymerized by a unique method enables to control an ion-cluster structure formed in a fluoroelectrolyte, and that control of the ion-cluster structure in the electrolyte membrane causes high conductivity even at low humidity. The technique achieved by the present inventors provides an electrolyte having high conductivity even under high-temperature and low-humidity conditions, and thereby enables to provide a fuel cell with higher performance.

On the other hand, the present inventors have also found that problems in processability occur; for example, a fluoropolymer electrolyte is easily softened if it has a low equivalent weight, and a membrane produced therefrom absorbs moisture in the air to suffer creases.

Means for Solving the Problems

Thus, the present invention aims to improve processability of a fluoropolymer electrolyte having a low equivalent weight and high proton conductivity.

In other words, the present invention provides a fluoropolymer electrolyte material whose processability is improved and which is easy to produce by preparing a spherical particulate substance having a large particle size as a fluoropolymer electrolyte and making an emulsion in which the particulate substance is dispersed in an aqueous medium.

The present invention relates to an electrolyte emulsion comprising an aqueous medium and a fluoropolymer electrolyte dispersed in the aqueous medium, wherein the fluoropolymer electrolyte has a monomer unit that has an $SO_3Z$ group (wherein Z is an alkali metal, an alkaline-earth metal, hydrogen, or $NR^1R^2R^3R^4$, wherein $R^1$, $R^2$, $R^3$, and $R^4$ each are individually a C1-C3 alkyl group or hydrogen), the electrolyte has an equivalent weight (EW) of 250 or more and 700 or less, a proton conductivity at 110° C. and relative humidity 50% RH of 0.10 S/cm or higher, and the ratio (the number of $SO_2F$ groups)/(the number of $SO_3Z$ groups) of 0 to 0.01, and the electrolyte is a spherical particulate substance having an average particle size of 10 to 500 nm.

The equivalent weight (EW) of the fluoropolymer electrolyte is preferably 250 or more and 650 or less.

Preferably, the fluoropolymer electrolyte comprises a repeating unit ($\alpha$) derived from an $SO_3Z$ group-containing monomer represented by the following formula (I):

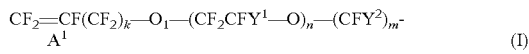

$$CF_2=CF(CF_2)_k-O_1-(CF_2CFY^1-O)_n-(CFY^2)_m-A^1 \quad (I)$$

wherein $Y^1$ is F, Cl, or a perfluoroalkyl group; k is an integer of 0 to 2; l is 0 or 1; n is an integer of 0 to 8; $nY^1$s may be the same as or different from each other; $Y^2$ is F or Cl; m is an integer of 0 to 6, provided that if m=0, l=0 and n=0; $mY^2$s may be the same as or different from each other; $A^1$ is $SO_3Z$, wherein Z is an alkali metal, an alkaline-earth metal, hydrogen, or $NR^1R^2R^3R^4$ wherein $R^1$, $R^2$, $R^3$, and $R^4$ each are individually a C1-C3 alkyl group or hydrogen; and a repeating unit ($\beta$) derived from an ethylenic fluoromonomer that is different from the monomer that provides the repeating unit ($\alpha$), and the repeating unit ($\alpha$) is in an amount of 10 to 95 mol %, the repeating unit ($\beta$) is in an amount of 5 to 90 mol %, and the sum of the amounts of the repeating unit ($\alpha$) and the repeating unit ($\beta$) is 95 to 100 mol %.

In the fluoropolymer electrolyte, preferably, k is 0, l is 1, $Y^1$ is F, n is 0 or 1, $Y^2$ is F, m is 2 or 4, and $A^1$ is $SO_3H$.

In the fluoropolymer electrolyte, preferably, n is 0 and m is 2.

The fluoropolymer electrolyte preferably has a distance between ionic clusters of 0.1 nm or higher and 2.6 nm or lower at 25° C. and relative humidity 50% RH by small angle X-ray measurement based on the following formula (1):

$$d=\lambda/2/\sin(\theta m) \quad (1)$$

wherein d is a distance between ionic clusters, $\lambda$ is an incident X-ray wavelength used in the small angle X-ray measurement, and $\theta m$ is a Bragg angle which indicates a peak.

The fluoropolymer electrolyte is preferably obtainable by chemically treating a fluoropolymer electrolyte precursor, and preferably, the fluoropolymer electrolyte precursor has a group that to be converted, by the chemical treatment, into $SO_3Z$ (wherein Z is an alkali metal, an alkaline-earth metal, hydrogen, or $NR^1R^2R^3R^4$ wherein $R^1$, $R^2$, $R^3$, and $R^4$ each are individually a C1-C3 alkyl group or hydrogen), is melt-flowable, and has a melt-flow rate of 0.01 to 100 g/10 min.

The chemical treatment is preferably a treatment of making the fluoropolymer electrolyte precursor in contact with a basic reactive liquid.

The electrolyte emulsion preferably contains 2 to 80% by mass of the fluoropolymer electrolyte.

The aqueous medium preferably has a water content of more than 50% by mass.

The present invention also relates to a method for producing an electrolyte membrane. The method comprises: applying the electrolyte emulsion to a substrate; drying the electrolyte emulsion applied to the substrate to provide an electrolyte membrane; and peeling the electrolyte membrane off from the substrate.

The present invention also relates to an electrolyte membrane obtainable by the above method for producing an electrolyte membrane.

The present invention also relates to a method for producing an electrode catalyst layer. The method comprises: dispersing composite particles of a catalyst metal and a conductive agent in the electrolyte emulsion to prepare an electrode catalyst composition; applying the electrode catalyst composition to a substrate; and drying the electrode catalyst composition applied to the substrate to provide an electrode catalyst layer.

The present invention also relates to an electrode catalyst layer obtainable by the above method for producing an electrode catalyst layer.

The present invention also relates to a membrane electrode assembly comprising the electrolyte membrane.

The present invention also relates to a membrane electrode assembly comprising the electrode catalyst layer.

The present invention also relates to a polymer electrolyte fuel cell comprising the membrane electrode assembly.

The present invention also relates to a method for producing an electrolyte emulsion. The method comprises: Step (1) in which an ethylenic fluoromonomer and a fluorovinyl compound having an $SO_2Z^1$ group ($Z^1$ is a halogen element) are copolymerized at a polymerization temperature of 0° C. or higher and 40° C. or lower to provide a precursor emulsion containing a fluoropolymer electrolyte precursor; and Step (2) in which a basic reactive liquid is added to the precursor emulsion and the fluoropolymer electrolyte precursor is chemically treated, whereby an electrolyte emulsion with a fluoropolymer electrolyte dispersed therein is provided. In the method, the electrolyte emulsion has an equivalent weight (EW) of 250 or more and 700 or less.

The above method for producing an electrolyte emulsion is preferably a method for producing the aforementioned electrolyte emulsion of the present invention.

Effects of the Invention

Since the electrolyte emulsion of the present invention has the above feature(s), it shows good processability when processed into an electrolyte membrane or an electrode catalyst layer, for example, and such products are easily produced. Thus, use of the electrolyte emulsion of the present invention enables to produce high-output fuel cells at low cost and high productivity.

BRIEF DESCRIPTION OF THE DRAWINGS

FIG. 1 is a graph showing the results of the examples and comparative examples, wherein the horizontal axis indicates a distance between ionic clusters and the vertical axis indicates 50% RH conductivity.

MODES FOR CARRYING OUT THE INVENTION

The following will describe modes for carrying out the present invention (hereinafter, referred to as embodiments of the invention) in detail. Note that the present invention is not limited to the following embodiments and may be varied within the scope of its features.

The present invention relates to an electrolyte emulsion comprising an aqueous medium and a fluoropolymer electrolyte dispersed in the aqueous medium.

The fluoropolymer electrolyte is a spherical particulate substance having an average particle size of 10 to 500 nm.

The term "spherical particulate substance" herein means a substantially spherical particulate substance, and the phrase "substantially spherical" means that the aspect ratio is 3.0 or lower. Generally, the closer to 1.0 the aspect ratio is, the closer to a sphere the substance is.

The aspect ratio of the spherical particulate substance is preferably 3.0 or lower. The upper limit thereof is more preferably 2.0, and further preferably 1.5. The lower limit of the aspect ratio of the spherical particulate substance is, for example, 1.0.

If the shapes of the polymer particles show anisotropy, the emulsion is likely to have high viscosity, in general. In contrast, if the fluoropolymer electrolyte is a spherical particulate substance, the viscosity of the electrolyte emulsion is lower than that in the case that the particles are not spherical, and the fluoropolymer electrolyte does not affect handleability even though its solids concentration is made high. Thus, for example, high productivity can be achieved in the case of producing a membrane by a method such as cast film formation.

The average particle size of the fluoropolymer electrolyte is 10 to 500 nm. If the average particle size is less than 10 nm, the active point is covered and good cell characteristics may not be achieved in the case that the electrolyte is used as an electrode material.

The upper limit of the average particle size may be 500 nm from the viewpoints of stability of the electrolyte emulsion and easy production of the precursor emulsion. Even if the average particle size is higher than 500 nm, the cell characteristics are not greatly affected.

As the average particle size is within the above appropriate range, the viscosity of the electrolyte emulsion is low, handleability is excellent even though the solids concentration of the fluoropolymer electrolyte is high, and high producibility is achieved upon producing a membrane.

The average particle size of the fluoropolymer electrolyte is more preferably 10 to 300 nm. The lower limit of the average particle size is further preferably 30 nm, and the upper limit thereof is further preferably 160 nm.

The aspect ratio and the average particle size are determined as follows. The electrolyte emulsion is applied to a glass substrate; the aqueous medium is removed to provide an aggregate of the fluoropolymer electrolyte; the aggregate is observed using a scanning or transmission electron microscope, an atomic force microscope, or the like; 20 or more particles in the obtained image each were measured for the lengths of its major and minor axes; the average value of the ratios of the lengths of the major and minor axes (major axis/minor axis) is treated as the aspect ratio mentioned above, while the average value of the lengths of the major and minor axes is treated as the average particle size mentioned below.

The equivalent weight (EW), that is, the dried weight per equivalent of an ion-exchange group, of the fluoropolymer electrolyte is 250 or more and 700 or less. Since the EW is small as mentioned here, a high ion conductivity can be achieved, and thus the electrolyte is suitably used for producing an electrolyte material used for, for example, fuel cells. The upper limit of the EW is preferably 650. An EW of higher than 650 may cause poor membrane producibility. The upper limit thereof is more preferably 600, further preferably 550, and particularly preferably 500. The upper limit of the EW is also preferably 450. An EW of 450 or lower leads to an extremely high ion conductivity, and thus the electrolyte is particularly suitable as materials for producing electrolyte membranes and electrode catalyst layers used for fuel cells. Therefore, the electrolyte can be particularly suitably used for various applications requiring a high ion conductivity. The lower limit of the EW is preferably 300, more preferably 350, and further preferably 390. A smaller EW is preferable because it leads to a higher conductivity, while it may cause a higher solubility in hot water. Thus, the EW is preferably within the above appropriate range.

Further, the fluoropolymer electrolyte has a proton conductivity of 0.10 S/cm or higher at 110° C. and relative humidity 50% RH. Preferably, the proton conductivity at 40% RH is 0.10 S/cm or higher; more preferably, the proton conductivity at 30% RH is 0.10 S/cm or higher; further preferably, the proton conductivity at 25% RH is 0.10 S/cm or higher; and particularly preferably, the proton conductivity at 23% RH is 0.10 S/cm or higher. The proton conductivity of the fluoropolymer electrolyte is preferably as high as possible; for example, the proton conductivity at 110° C. and relative humidity 50% RH may be 1.0 S/cm or lower.

Since the fluoropolymer electrolyte has a proton conductivity in the aforementioned range, the electrolyte emulsion of the present invention enables to produce products such as electrolyte membranes and electrode catalyst layers which can be applied to driving under high-temperature and low-humidity conditions and which show high performance in various driving environments.

The proton conductivity can be measured as follows using a polymer membrane water content test apparatus (e.g. an MSB-AD-V-FC polymer membrane water content test apparatus, BEL Japan, Inc.): a polymer electrolyte membrane produced with a thickness of 50 μm is cut out into a size of 1 cm in width and 3 cm in length, and is mounted on a cell for conductivity measurement; the cell for conductivity measurement is then placed inside a chamber of the test device, and the conditions inside the chamber are adjusted to 110° C. and lower than 1% RH; water vapor generated from ion-exchange water is introduced into the chamber; the inside of the chamber is humidified to 10% RH, 30% RH, 50% RH, 70% RH, 90% RH, and 95% RH in this order, and the conductivities at the respective humidities are measured.

Further, the fluoropolymer electrolyte has a unique ion-cluster structure. In other words, the fluoropolymer electrolyte preferably has a distance between ionic clusters of 0.1 nm or longer and 2.6 nm or shorter at 25° C. and 50% RH. FIG. 1 is a graph showing the results of the examples and comparative examples mentioned below, wherein the horizontal axis indicates a distance between ionic clusters and the vertical axis indicates conductivity under high-temperature and low-humidity conditions. The graph shows that the conductivity greatly increases as the distance between ionic clusters decreases to 2.6 nm or lower.

The upper limit of the distance between ionic clusters is more preferably 2.5 nm. The lower limit of the distance between ionic clusters may be 0.5 nm, 1.0 nm, or 2.0 nm, for example.

The fluoropolymer electrolyte having a distance between ionic clusters within the above range enables to produce products such as electrolyte membranes and electrode catalyst layers which are particularly suitable for driving under high-temperature and low-humidity conditions and which show high performance under various driving environments.

An ion cluster is an ion channel formed by aggregation of proton exchange groups, and perfluoro proton exchange membranes such as Nafion are considered to have such an ion-cluster structure (for example, see Gierke. T. D., Munn. G. E., and Wilson. F. C., J. Polymer Sci. Polymer Phys, 1981, 19, 1687).

The distance between ionic clusters d can be measured and calculated by the following method.

The prepared fluoropolymer electrolyte is subjected to small-angle X-ray scattering measurement at 25° C. and 50% RH. The obtained scattering intensities are plotted with respect to Bragg angles θ, and the Bragg angle θm at a peak position derived from a cluster structure which is generally observed at 2θ>1°. The distance between ionic clusters d is calculated by the following formula (1) based on the angle θm:

$$d = \lambda/2/\sin(\theta m) \quad (1)$$

wherein λ is an incident X-ray wavelength.

In the case that the membrane for this measurement is produced by a casting method, the membrane is previously annealed at 160° C. In addition, the fluoropolymer electrolyte is treated so that the terminal group represented by an $SO_3Z$ group is converted into $SO_3H$. The sample membrane is left standing at 25° C. and 50% RH for 30 minutes or longer before the measurement, and then the measurement is performed.

In the fluoropolymer electrolyte, the distance between ion clusters is short. Thus, protons presumably easily move between the ion clusters, and the electrolyte has high conductivity even at low humidity.

The fluoropolymer electrolyte has a monomer unit having an $SO_3Z$ group (Z is an alkali metal, an alkaline-earth metal, hydrogen, or $NR^1R^2R^3R^4$ wherein $R^1$, $R^2$, $R^3$, and $R^4$ each are individually a C1-C3 alkyl group or hydrogen).

The fluoropolymer electrolyte has a ratio (the number of $SO_2F$ groups)/(the number of $SO_3Z$ groups) of 0 to 0.01. The ratio "(the number of $SO_2F$ groups)/(the number of $SO_3Z$ groups)" is a ratio of the number of $SO_2F$ groups to the number of $SO_3Z$ groups in the fluoropolymer electrolyte, and the ratio can be determined as follows.

In the case of producing the fluoropolymer electrolyte by converting —$SO_2F$ groups in a fluoropolymer electrolyte precursor having —$SO_2F$ groups, for example, (the number of $SO_3Z$ groups in fluoropolymer electrolyte) can be approximately considered as {(the number of $SO_2F$ groups in fluoropolymer electrolyte precursor)–(the number of $SO_2F$ groups in fluoropolymer electrolyte)}. In other words, the ratio (the number of $SO_2F$ groups)/(the number of $SO_3Z$ groups) of the fluoropolymer electrolyte can be determined by measuring (the number of $SO_2F$ groups in fluoropolymer electrolyte) and (the number of $SO_2F$ groups in fluoropolymer electrolyte precursor) by infrared absorption spectrometry, and calculating the ratio therebetween.

Specifically, a film of the precursor prepared by a technique such as heat-pressing is subjected to Fourier transform infrared spectroscopy. The intensity ($I_{OC}$) at an absorption peak derived from $CF_2$ at around 2364 cm$^{-1}$ and the intensity ($I_{OS}$) at an absorption peak derived from $SO_2F$ groups at around 2704 cm$^{-1}$ are measured, and the ratio $A_0 = I_{OS}/I_{OC}$ is determined. Then, the fluoropolymer electrolyte is formed into a film by a technique such as casting film formation, and the film is similarly subjected to Fourier transform infrared spectroscopy. Thereby, the intensity ($I_{1C}$) at an absorption peak derived from $CF_2$ and the intensity ($I_{1S}$) at an absorption peak derived from $SO_2F$ groups are measured and the ratio $A_1 = I_{1S}/I_{1C}$ is determined. The ratio (the number of $SO_2F$ groups)/(the number of $SO_3Z$ groups) in the fluoropolymer electrolyte can be calculated as $A_1/A_0$.

In general, the number of $SO_2F$ groups in the fluoropolymer electrolyte is as small as negligible in comparison with the number of $SO_3Z$ groups. Thus, the number of $SO_3Z$ groups in the polymer electrolyte can be regarded as the number of $SO_2F$ groups in the precursor ((the number of $SO_3Z$ groups in polymer electrolyte)=(the number of $SO_2F$ groups in precursor)).

The fluoropolymer electrolyte preferably has 10 to 95 mol % of the $SO_3Z$ group-containing monomer units in the whole monomer units. The term "whole monomer units" herein means all the portions derived from the monomers in terms of the molecular structure of the fluoropolymer electrolyte.

The $SO_3Z$ group-containing monomer unit is generally derived from an $SO_3Z$ group-containing monomer represented by the following formula (I):

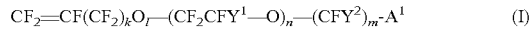

$$CF_2{=}CF(CF_2)_kO_l{-}(CF_2CFY^1{-}O)_n{-}(CFY^2)_m{-}A^1 \quad (I)$$

wherein $Y^1$ is F, Cl, or a perfluoroalkyl group; k is an integer of 0 to 2; l is 0 or 1; n is an integer of 0 to 8; $nY^1$s may be the same as or different from each other; $Y^2$ is F or Cl; m is an integer of 0 to 6, provided that if m=0, l=0 and n=0; $mY^2$s may be the same as or different from each other; $A^1$ is $SO_3Z$, Z is an alkali metal, alkaline-earth metal, hydrogen, or $NR^1R^2R^3R^4$, wherein $R^1$, $R^2$, $R^3$, and $R^4$ each are individually a C1-C3 alkyl group or hydrogen.

In formula (I), k is more preferably 0; l is more preferably 1; n is more preferably 0 or 1, and n is further preferably 0; more preferably, $Y^2$ is F and m is an integer of 2 to 6; further preferably, $Y^2$ is F and m is 2 or 4; particularly preferably, $Y^2$ is F and m is 2; $Y^1$ is preferably F; and $A^1$ is preferably $SO_3H$, for good synthesis and operability.

In the fluoropolymer electrolyte, one type of the $SO_3Z$ group-containing monomer may be used, or two or more types of the monomers may be used in combination.

The fluoropolymer electrolyte is preferably a copolymer including a repeating unit (α) derived from the $SO_3Z$ group-containing monomer and a repeating unit (β) derived from an ethylenic fluoromonomer that is different from the monomer that provides a repeating unit (α).

The ethylenic fluoromonomer that provides a repeating unit (β) is a monomer which is free from an ether oxygen [—O—] and which has a vinyl group. In the vinyl group, part or all of the hydrogen atoms may be replaced with fluorine atoms.

The term "ether oxygen" herein means the structure —O— constituting the monomer molecule.

Examples of the ethylenic fluoromonomer include haloethylenic fluoromonomers represented by the following formula (II):

$$CF_2{=}CF{-}Rf^1 \quad (II)$$

wherein $Rf^1$ is F, Cl, or a C1-C9 linear or branched fluoroalkyl group, and hydrogen-containing fluoroethylenic fluoromonomers represented by the following formula (III):

$$CHY^3=CFY^4 \quad (III)$$

wherein $Y^3$ is H or F; and $Y^4$ is H, F, Cl, or a C1-C9 linear or branched fluoroalkyl group.

Examples of the ethylenic fluoromonomer include tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene, and perfluorobutylethylene. Preferable are TFE, VDF, CTFE, trifluoroethylene, vinyl fluoride, and HFP. More preferable are TFE, CTFE, and HFP. Further preferable are TFE and HFP. Particularly preferable is TFE. Each of the ethylenic fluoromonomers may be used alone, or two or more of these may be used in combination.

The fluoropolymer electrolyte is preferably a copolymer containing 10 to 95 mol % of the repeating unit ($\alpha$) derived from the $SO_3Z$ group-containing monomer, 5 to 90 mol % of the repeating unit ($\beta$) derived from the ethylenic fluoromonomer, and 95 to 100 mol % in total of the repeating unit ($\alpha$) and the repeating unit ($\beta$) in the whole monomer units.

With respect to the amount of the repeating unit ($\alpha$) derived from the $SO_3Z$ group-containing monomer, the lower limit is more preferably 15 mol %, and further preferably 20 mol %, while the upper limit is more preferably 60 mol %, and further preferably 50 mol %.

With respect to the amount of the repeating unit ($\beta$) derived from the ethylenic fluoromonomer, the lower limit is more preferably 35 mol %, further preferably 40 mol %, and particularly preferably 45 mol %. The lower limit of the amount of the repeating unit ($\beta$) is also preferably 50 mol %. The upper limit thereof is more preferably 85 mol %, and further preferably 80 mol %.

The fluoropolymer electrolyte in the present invention may have, as a third monomer component other than the above monomers, a repeating unit ($\gamma$) derived from a vinyl ether which is not the $SO_3Z$ group-containing monomer in an amount of preferably 0 to 5 mol %, more preferably 4 mol % or less, and further preferably 3 mol % or less.

The polymer composition of the fluoropolymer electrolyte may be calculated from the value measured in high-temperature NMR at 300° C.

The vinyl ether which is not the $SO_3Z$ group-containing monomer and which provides a repeating unit ($\gamma$) is not particularly limited as long as it is free from an $SO_3Z$ group. Examples thereof include fluorovinyl ethers, more preferably perfluorovinyl ethers, represented by the following formula (IV):

$$CF_2=CF-O-Rf^2 \quad (IV)$$

wherein $Rf^2$ is a C1-C9 fluoroalkyl group or a C1-C9 fluoropolyether group, and hydrogen-containing vinyl ethers represented by the following formula (V):

$$CHY^5=CF-O-Rf^3 \quad (V)$$

wherein $Y^5$ is H or F; $Rf^3$ is a C1-C9 linear or branched fluoroalkyl group which may have an ether group. Each of the vinyl ethers may be used alone, or two or more thereof may be used in combination.

The electrolyte emulsion preferably contains 2 to 80% by mass (in solids concentration) of the fluoropolymer electrolyte. If the amount of the fluoropolymer electrolyte is too small, the amount of an aqueous medium is too large and, in the case of film formation, the productivity may be poor. If the amount of the fluoropolymer electrolyte is too large, the viscosity is so high that handling of the emulsion is likely to be difficult. The lower limit of the amount is more preferably 5% by mass, while the upper limit thereof is more preferably 60% by mass.

The aqueous medium may contain only water. If the electrolyte emulsion is desired to have good dispersibility, the aqueous medium may contain an organic polar solvent in addition to water. Examples of the organic polar solvent include alcohols such as methanol, ethanol, n-propanol, and isopropanol; nitrogen-containing solvents such as N-methylpyrrolidone [NMP]; ketones such as acetone; esters such as ethyl acetate; polar ethers such as diglyme and tetrahydrofuran [THF]; and carbonate esters such as diethylene carbonate. Each of these organic polar solvents may be used alone, or two or more of these may be used in combination. The aqueous medium may contain an alcohol for improving a leveling ability and a polyoxyethylene for improving a film-forming ability for the purpose of film formation by casting, impregnation, or the like as mentioned below.

The aqueous medium preferably has a water content of higher than 50% by mass. Too low a water content is not preferable because it is likely to cause poor dispersibility and have a bad influence on the environment and human bodies. The lower limit of the water content is more preferably 60% by mass, and further preferably 70% by mass, and it is also preferably 100% by mass. The aqueous medium also preferably contains 70 to 100% by mass of water and 30 to 0% by mass of one or more alcohols.

The following will describe a method for producing the electrolyte emulsion of the present invention.
(Method for Producing Electrolyte Emulsion)

The electrolyte emulsion of the present invention may be produced by the following method. The present invention also relates to a method for producing an electrolyte emulsion. The method comprises:

Step (1) in which an ethylenic fluoromonomer and a fluorovinyl compound having an $SO_2Z^1$ group ($Z^1$ is a halogen element) are copolymerized at a polymerization temperature of 0° C. or higher and 40° C. or lower to provide a precursor emulsion containing a fluoropolymer electrolyte precursor; and Step (2) in which a basic reactive liquid is added to the precursor emulsion and the fluoropolymer electrolyte precursor is chemically treated, whereby an electrolyte emulsion with a fluoropolymer electrolyte dispersed therein is provided. In this method, the electrolyte emulsion has an equivalent weight (EW) of 250 or more and 700 or less.

The present inventors have performed various studies, and have found the following. That is, a low-EW fluoropolymer electrolyte has many proton exchangeable groups and its volume is greatly increased by an organic solvent, resulting in problems which cause poor productivity; for example, a large amount of an alkaline aqueous solution is required or a high-concentration alkaline aqueous solution is required. In addition, a washing process after hydrolysis is extremely complicated. These problems have not been found until the production of a low-EW polymer electrolyte.

The method for producing an electrolyte emulsion of the present invention is devised after the present inventors have found that addition of a basic reactive liquid to the precursor emulsion in Step (2) enables to solve the problems, and thus an electrolyte emulsion with a low-EW fluoropolymer electrolyte dispersed therein can be easily and efficiently produced under mild conditions.

Further, the above production method does not include a step of re-dispersing or dissolving an electrolyte which has been once coagulated by a complicated operation such as sufficient stirring under heating. Thus, the method is excellent in productivity.

The fluoropolymer electrolyte precursor in the precursor emulsion obtained in Step (1) is preferably a spherical particulate substance having an average particle size of 10 to 500 nm.

It is important that the above production method does not include an operation of coagulating particles in the emulsion, such as flocculation or drying. If particles coagulate even only once, it is impossible to finally provide an electrolyte emulsion with a spherical particulate substance having an average particle size of 10 to 500 nm dispersed therein.

The fluoropolymer electrolyte precursor preferably has a group which is convertible into $SO_3Z$ (Z is an alkali metal, an alkaline-earth metal, hydrogen, or $NR^1R^2R^3R^4$, and $R^1$, $R^2$, $R^3$, and $R^4$ each are individually a C1-C3 alkyl group or hydrogen) by chemical treatment.

In Step (1), the fluoropolymer electrolyte precursor is preferably provided by copolymerizing an ethylenic fluoromonomer and a fluorovinyl compound having an $SO_2Z^1$ group ($Z^1$ is a halogen element) which is convertible into $SO_3Z$ (Z is an alkali metal, an alkaline-earth metal, hydrogen, or $NR^1R^2R^3R^4$, and $R^1$, $R^2$, $R^3$, and $R^4$ each are individually a C1-C3 alkyl group or hydrogen) by chemical treatment (hereinafter, referred to simply as a fluorovinyl compound).

The fluorovinyl compound is preferably a fluorovinyl compound represented by the following formula (VI):

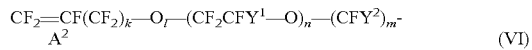

(VI)

wherein $Y^1$ is F, Cl or a perfluoroalkyl group; k is an integer of 0 to 2; l is 0 or 1; n is an integer of 0 to 8; $nY^1$s may be the same as or different from each other; $Y^2$ is F or Cl; m is an integer of 0 to 6, provided that if m=0, l=0 and n=0; $mY^2$s may be the same as or different from each other; $A^2$ is $SO_2Z^1$, and $Z^1$ is a halogen element.

In formula (VI), k is preferably 0 and l is preferably 1 for good synthesis and operability. In order to achieve a low EW, n is more preferably 0 or 1, and n is further preferably 0. More preferably, $Y^2$ is F and m is an integer of 2 to 6. Further preferably, $Y^2$ is F and m is 2 or 4. Particularly preferably, $Y^2$ is F and m is 2. $Y^1$ is preferably F.

Specific examples of the fluorovinyl compound represented by formula (VI) include $CF_2=CFO(CF_2)_P—SO_2F$, $CF_2=CFOCF_2CF(CF_3)O(CF_2)_P—SO_2F$, $CF_2=CF(CF_2)_{P-1}—SO_2F$, and $CF_2=CF(OCF_2CF(CF_3))_P—(CF_2)_{P-1}—SO_2F$, wherein P is an integer of 1 to 8.

In Step (1), each of the fluorovinyl compounds may be used alone or two or more of these may be used in combination.

The ethylenic fluoromonomer may be any of the aforementioned substances. If desired, a third monomer component other than the ethylenic fluoromonomer and the fluorovinyl compound may be polymerized.

In order to finally provide a fluoropolymer electrolyte as a spherical particulate substance having an average particle size of 10 to 500 nm, the polymerization method in Step (1) must be a polymerization method in which an aqueous solution of a surfactant is used as a polymerization solvent, and a fluorovinyl compound and a gaseous ethylenic fluoromonomer are reacted with each other in a state that the components are filling-dissolved in the polymerization solvent (that is, emulsion polymerization). Solution polymerization, bulk polymerization, and suspension polymerization cannot provide a fluoropolymer electrolyte as a spherical particulate substance having an average particle size of 10 to 500 nm. Also in order to efficiently provide a polymer having an equivalent weight (EW) of 250 or more and 700 or less, the emulsion polymerization is preferable.

The emulsion polymerization may be a polymerization method in which an aqueous solution of a surfactant and a coemulsifier such as an alcohol is used, and a fluorovinyl compound and a gaseous ethylenic fluoromonomer are reacted with each other in a state that the components are filling-emulsified in this aqueous solution (mini-emulsion polymerization or micro-emulsion polymerization). The mini-emulsion polymerization and the micro-emulsion polymerization lead to a higher apparent polymerization rate.

In Step (1), the ethylenic fluoromonomer and the fluorovinyl compound are preferably copolymerized at a polymerization temperature of 0° C. or higher and 40° C. or lower. In addition, Step (1) is preferably a step which provides a fluoropolymer electrolyte precursor emulsion by emulsion polymerization at a polymerization temperature of 0° C. or higher and 40° C. or lower. Although the reason is not clear, a polymerization reaction at the above polymerization temperature enables to adjust the distance between ionic clusters of the fluoropolymer electrolyte in the aforementioned specific range, and thus high conductivity is achieved even at low humidity. The polymerization temperature is more preferably 5° C. or higher and 35° C. or lower.

The emulsion polymerization is preferably a polymerization method in which, in an aqueous solution of a surfactant prepared in a pressure container, a fluorovinyl compound and a gaseous ethylenic fluoromonomer are radical-copolymerized using radicals generated from a polymerization initiator. The fluorovinyl compound may be filling-emulsified by a strong shearing force with a surfactant and a coemulsifier such as an alcohol.

In order to control the composition of a polymer to be generated, the method is preferably one which is capable of controlling a pressure derived from the gaseous ethylenic fluoromonomer. The pressure is preferably −0.05 MPaG or higher and 2.0 MPaG or lower. The pressure (MPaG) herein is a value on a pressure gauge (gauge pressure) with the atmospheric pressure as 0 MPa. In order to achieve a low EW, the pressure is preferably low in general, but too low a pressure may cause a long polymerization time, and thus the process may be inefficient. The lower limit of the pressure is more preferably 0.0 MPaG, and further preferably 0.1 MPaG. The upper limit thereof is more preferably 1.0 MPaG, and further preferably 0.7 MPaG.

Further, in general, the gaseous ethylenic fluoromonomer is consumed and the pressure decreases, as the polymerization reaction proceeds. Thus, the gaseous ethylenic fluoromonomer is preferably added as appropriate. In addition, the method of additionally supplying the fluorovinyl compound simultaneously consumed is also preferably used. The fluorovinyl compound to be added may be filling-emulsified by a strong shear force with a surfactant and a coemulsifier such as an alcohol. If the fluorovinyl compound is a liquid, it may be injected using a metering pump or under pressure by an inert gas, for example.

The fluoropolymer electrolyte precursor is preferably melt-flowable. In the present embodiments, the melt-flow rate (hereinafter abbreviated as "MFR") may be used as an indicator of the polymerization degree of the fluoropolymer electrolyte precursor. In the present embodiments, the MFR of the fluoropolymer electrolyte precursor is preferably 0.01 (g/10 min) or higher, more preferably 0.1 (g/10 min) or higher, and further preferably 0.3 (g/10 min) or higher. The upper limit of the MFR is preferably 100 (g/10 min) or lower, more preferably 20 (g/10 min) or lower, further preferably 16 (g/10 min) or lower, and particularly preferably 10 (g/10 min) or lower.

An MFR of lower than 0.01 (g/10 min) may cause failure in molding processes such as film formation. An MFR of higher than 100 (g/10 min) may cause low strength of a film obtained by molding the precursor, and may cause poor durability if the precursor is used for fuel cells.

In order to adjust the MFR to 0.01 (g/10 min) or higher and 100 (g/10 min) or lower, the emulsion polymerization is preferably performed at a temperature of 0° C. or higher and 40° C. or lower. If the temperature is higher than 40° C., disproportionation, in which radicals of polymer ends are β-transformed and the polymerization stops, proceeds at a higher rate, so that a high-molecular-weight polymer may not be provided. The temperature is more preferably 35° C. or lower, and further preferably 30° C. or lower. On the other hand, if the temperature is lower than 0° C., the polymerization may proceed very slowly and the productivity may be very poor. The temperature is more preferably 5° C. or higher, and further preferably 10° C. or higher.

The polymerization initiator used in Step (1) is preferably a water-soluble one. Examples thereof include inorganic peroxides such as persulfuric acid compounds, perboric acid compounds, perchloric acid compounds, perphosphoric acid compounds, and percarbonic acid compounds; and organic peroxides such as disuccinyl peroxides, t-butyl permaleate, and t-butyl hydroperoxide. Examples of the inorganic peroxides may include ammonium salts, sodium salts, and potassium salts.

Combination of any of the water-soluble polymerization initiators and a reducing agent, that is, a redox initiator, may be suitably used. Examples of the reducing agent include sulfites, bisulfites, salts of low-valence ions such as iron, copper, and cobalt, hypophosphorous acid, hypophosphites, organic amines such as N,N,N',N'-tetramethylethylenediamine, and reducing sugars such as aldoses and ketoses. Particularly in the case that the polymerization temperature is 30° C. or lower, a redox initiator is preferably used.

Azo compounds are also most preferable initiators in the present invention. Examples thereof include 2,2'-azobis-2-methylpropionamidine hydrochloride, 2,2'-azobis-2,4-dimethylvaleronitrile, 2,2'-azobis-N,N'-dimethyleneisobutylamidine hydrochloride, 2,2'-azobis-2-methyl-N-(2-hydroxyethyl)-propionamide, 2,2'-azobis-2-(2-imidazolin-2-yl)-propane and salts thereof, 4,4'-azobis-4-cyanovaleric acid and salts thereof. Further, two or more of the aforementioned polymerization initiators may be used in combination. The amount of the polymerization initiator is about 0.001 to 5% by mass to the monomer.

The polymerization initiator may be put into a pressure container before the introduction of the ethylenic fluoromonomer, or may be injected in an aqueous solution form after the introduction thereof.

In the case of a redox initiator, a polymerization initiator and/or a reducing agent are/is preferably added in succession.

The emulsifier used in Step (1) is not particularly limited and is preferably one having a less chain-transferring ability. For example, an emulsifier represented by $RfZ^3$ may be used. Here, Rf is a C4-C20 alkyl group, part or all of hydrogen atoms therein are replaced with fluorine, it may have an ether oxygen, and may have an unsaturated bond copolymerizable with the ethylenic fluoromonomer. $Z^3$ is a dissociative polar group, and $—COO^-B^+$ or $—SO_3^-B^+$ is preferably used. Here, $B^+$ is a monovalent cation such as an alkali metal ion, ammonium ion, or hydrogen ion.

Examples of the emulsifier represented by $RfZ^3$ include $Y(CF_2)_nCOO^-B^+$ (n is an integer of 4 to 20, Y is fluorine or hydrogen), $CF_3—OCF_2CF_2—OCF_2CF_2COO^-B^+$, and $CF_3—(OCF(CF_3)CF_2)_nCOO^-B^+$ (n is an integer of 1 to 3).

The amount of the emulsifier is not particularly limited. It is preferably 0.01% by mass or more and 10% by mass or less in an aqueous solution. The larger the amount of the emulsifier is, the more the polymerized particles tend to be, and the higher the apparent polymerization rate tends to be. If the amount is less than 0.01% by mass, the emulsified particles may not be stably maintained. If the amount is more than 10% by mass, washing in the post-process is difficult. The lower limit of the amount is more preferably 0.05% by mass, and further preferably 0.1% by mass. The upper limit thereof is more preferably 5% by mass, and further preferably 3% by mass.

In Step (1), what is called "seed polymerization", wherein polymerization is performed using a large amount of an emulsifier to provide a dispersion, and the obtained dispersion is diluted and polymerization is continued, may be performed in order to increase the number of polymerized particles.

The polymerization duration is not particularly limited, and is generally 1 to 48 hours. The polymerization pH is also not particularly limited, and may be adjusted during the polymerization, if necessary. Examples of a pH adjuster usable in this case include alkalizing agents such as sodium hydroxide, potassium hydroxide, and ammonia, mineral acids such as phosphoric acid, sulfuric acid, and hydrochloric acid, and organic acids such as formic acid and acetic acid.

In addition, a chain transfer agent may be used so as to adjust the molecular weight and molecular weight distribution. Preferable examples of the chain transfer agent include gaseous hydrocarbons such as ethane and pentane, water-soluble compounds such as methanol, and iodine compounds. In particular, iodine compounds are suitable because they enable to produce a block polymer by what is called iodine transfer polymerization.

Since a greater molecular weight of the fluoropolymer electrolyte leads to higher durability, no chain transfer agent is preferably used in Step (1).

The precursor emulsion preferably contains 2 to 80% by mass (in solids concentration) of the fluoropolymer electrolyte precursor. The lower limit of the amount is more preferably 5% by mass, and the upper limit thereof is more preferably 60% by mass.

In order to improve the durability of the fluoropolymer electrolyte provided by the production method of the present invention, unstable terminal groups of the fluoropolymer electrolyte precursor in the precursor emulsion provided in Step (1) may be stabilized. The unstable terminal groups of the fluoropolymer electrolyte precursor may be, for example, carboxylic acids, carboxylic acid salts, carboxylic acid esters, carbonates, hydrocarbons, and methylol, and may depend on types and the like of the polymerization method, initiator, chain transfer agent, and polymerization terminator to be used.

In the case that emulsion polymerization is selected as the polymerization method and no chain transfer agent is used, most of the unstable terminal groups are carboxylic acids.

The method of stabilizing the unstable terminal groups of the fluoropolymer electrolyte precursor is not particularly limited. For example, the groups are heat-decarboxylated and stabilized as $—CF_2H$ groups.

The method for producing an electrolyte emulsion of the present invention comprises Step (2) in which a basic reactive liquid is added to the precursor emulsion provided in Step (1) and the fluoropolymer electrolyte precursor is chemically treated, whereby an electrolyte emulsion with the fluoropolymer electrolyte dispersed therein is provided.

Step (2) is a step in which a basic reactive liquid is added to the precursor emulsion, and thereby the fluoropolymer electrolyte precursor and the basic reactive liquid are made in contact with each other, so that the fluoropolymer electrolyte precursor is chemically treated to provide an electrolyte emulsion. Examples of the chemical treatment include hydrolysis and acid treatment. Hydrolysis may be performed by adding a basic reactive liquid to the precursor emulsion.

The basic reactive liquid is not particularly limited, and is preferably an aqueous solution of a hydroxide of an alkali metal or alkaline-earth metal such as sodium hydroxide or potassium hydroxide. The amount of the hydroxide of an alkali metal or alkaline-earth metal is not particularly limited, and is preferably 10 to 30% by mass. The reaction liquid preferably contains a swellable organic compound such as methyl alcohol, ethyl alcohol, acetone, DMSO, DMAC, and DMF. The amount of the swellable organic compound is preferably 1 to 50% by mass. The treatment temperature depends on the type of a solvent, solvent composition, and the like conditions; the higher the temperature is, the shorter the treatment duration is. If the treatment temperature is too high, the polymer electrolyte precursor may be dissolved and is difficult to handle in such a case. Thus, the temperature is preferably 20° C. to 160° C. Further, in order to achieve high conductivity, all of functional groups convertible into $SO_3H$ are preferably hydrolyzed. Therefore, the treatment duration is preferably as long as possible. Too long a duration, however, may cause poor productivity, and thus the duration is preferably 0.5 to 48 hours.

In Step (2), it is also preferable to provide a protonated fluoropolymer electrolyte by sufficiently washing the product after the hydrolysis with hot water, if necessary, and then acid-treating the product. An acid used in the acid treatment is not particularly limited as long as it is selected from mineral acids such as hydrochloric acid, sulfuric acid, and nitric acid, and organic acids such as oxalic acid, acetic acid, formic acid, and trifluoroacetic acid.

In Step (2), the acid treatment is also preferably a treatment in which the precursor emulsion or the hydrolyzed precursor emulsion is made in contact with a cation exchange resin. For example, the acid treatment may be performed by passing the precursor emulsion or the hydrolyzed precursor emulsion through a container filled with a cation exchange resin.

The method for producing an electrolyte membrane is also one aspect of the present invention, the method comprising the steps of applying the electrolyte emulsion to a substrate, drying the electrolyte emulsion applied to the substrate to provide an electrolyte membrane, and peeling the electrolyte membrane off from the substrate. The above production method can provide an electrolyte membrane having a lower water content in comparison with the case of producing an electrolyte membrane from the electrolyte solution.

The aforementioned method for producing an electrolyte membrane is a method called casting film formation. Examples thereof include a method in which an electrolyte emulsion is developed on a container such as a laboratory dish; the emulsion is heated in, for example, an oven if necessary, so that the solvent is at least partially distilled off; and the dried emulsion is separated, for example, from the container, so that a film-shaped product is obtained. Examples thereof further include a method in which an electrolyte emulsion is cast on a substrate such as a glass plate or a film in a manner such that the thickness is uniform using a device such as a blade coater, gravure coater, or comma coater having a mechanism such as a blade, air knife, or reverse roll, so that a sheet-formed film is obtained. In addition, examples thereof may include a method of continuous casting film formation, so that a long film-shaped membrane is obtained.

The film is not particularly limited. The film may be prepared from a material selected from polyesters including polyethylene terephthalate (PET), polybutylene terephthalate (PBT), polyethylene naphthalate (PEN), and liquid crystal polyesters, triacetyl cellulose (TAC), polyarylate, polyether, polycarbonate (PC), polysulfone, polyethersulfone, cellophane, aromatic polyamide, polyvinyl alcohol, polyethylene (PE), polypropylene (PP), polyvinyl chloride (PVC), polystyrene (PS), acrylonitrile-butadiene-styrene copolymer (ABS), polymethyl methacrylate (PMMA), polyamide, polyacetal (POM), polyphenylene terephthalate (PPE), polybutylene terephthalate (PBT), polyphenylene sulfide (PPS), polyamide-imide (PAI), polyether imide (PEI), polyether ether ketone (PEEK), polyimide (PI), polymethyl pentene (PMP), polytetrafluoroethylene (PTFE), fluorinated ethylene-propylene (FEP), tetrafluoroethylene-ethylene (ETFE) copolymer, polyvinylidene fluoride (PVDF), polybenzazole (PBZ), polybenzoxazole (PBO), polybenzothiazole (PBT), polybenzimidazole (PBI), and poly-paraphenylene terephthalamide (PPTA).

The electrolyte membrane may be produced by the aforementioned casting film formation.

An electrolyte membrane obtainable by the above production method is also one aspect of the present invention. The thickness of the electrolyte membrane is preferably 1 μm or higher and 500 μm or lower, more preferably 2 μm or higher and 100 μm or lower, and further preferably 5 μm or higher and 50 μm or lower. A thin membrane can cause a low DC resistance upon power generation, but may also cause a large gas permeation amount. Thus, the thickness is preferably within the above appropriate range. In addition, the membrane may have a porous film prepared by extending a PTFE film as disclosed in JP 08-162132 A or fibrillated fibers disclosed in JP 53-149881 A and JP 63-61337 B.

The electrolyte emulsion of the present invention may be used as an electrolyte binder in an electrode catalyst layer. An electrode catalyst layer comprising the electrolyte emulsion is also one aspect of the present invention. In this case, an electrode catalyst layer is preferably produced by mixing the fluoropolymer electrolyte emulsion of the present invention and an electrode catalyst such as carbon-supported Pt to provide an electrode ink (electrode catalyst composition), applying the electrode ink to a substrate, and drying the electrode ink. The amount of the fluoropolymer electrolyte to be supported with respect to the electrode area is preferably 0.001 to 10 $mg/cm^2$, more preferably 0.01 to 5 $mg/cm^2$, and further preferably 0.1 to 1 $mg/cm^2$, in a state that an electrode catalyst layer is formed.

The electrode catalyst layer comprises a composite particulate substance which comprises fine particles of a catalyst metal and a conductive agent supporting the fine particles, and a polymer electrolyte as a binder. It may contain a water repellent, if necessary. The catalyst metal to be used for an electrode may be any metal which promotes oxidation of hydrogen and reduction of oxygen. The catalyst metal is preferably at least one metal selected from the group consisting of platinum, gold, silver, palladium, iridium, rhodium, ruthenium, iron, cobalt, nickel, chromium, tungsten, manganese, vanadium, and any alloy of these metals. Mainly used among these is platinum.

The conductive agent is not particularly limited as long as it is a particulate substance having conductivity (conductive particulate substance). The conductive particulate substance is preferably at least one conductive particulate substance selected from the group consisting of carbon blacks such as furnace black, channel black, and acetylene black, active carbon, graphite, and various metals. The particle size of the conductive agent is preferably 10 angstrom to 10 μm, more preferably 50 angstrom to 1 and most preferably 100 to 5,000 angstrom. The particle size of the fine particles of a catalyst metal (electrode catalyst particles) is not particularly limited, and is preferably 10 to 1,000 angstrom, more preferably 10 to 500 angstrom, and most preferably 15 to 100 angstrom.

In the composite particulate substance, the amount of the electrode catalyst particles to the conductive particulate substance is preferably 1 to 99% by mass, more preferably 10 to 90% by mass, and most preferably 30 to 70% by mass. Specifically, suitable examples thereof include carbon-supported Pt catalyst such as TEC10E40E (Tanaka Kikinzoku Kogyo K.K.).

The amount of the composite particulate substance is 20 to 95% by mass, preferably 40 to 90% by mass, more preferably 50 to 85% by mass, and most preferably 60 to 80% by mass, to the whole mass of the electrode catalyst layer.

The amount of the electrode catalyst to be supported with respect to the electrode area is preferably 0.001 to 10 mg/cm$^2$, more preferably 0.01 to 5 mg/cm$^2$, and most preferably 0.1 to 1 mg/cm$^2$, in a state that the electrode catalyst layer is formed. The thickness of the electrode catalyst layer is preferably 0.01 to 200 μm, more preferably 0.1 to 100 μm, and most preferably 1 to 50 μm.

The porosity of the electrode catalyst layer is not particularly limited, and is preferably 10 to 90% by volume, more preferably 20 to 80% by volume, and most preferably 30 to 60% by volume.

For improved repellency, the electrode catalyst layer of the present invention may further contain polytetrafluoroethylene (hereinafter, referred to as PTFE). In this case, PTFE may have any finite form, and is preferably in a particulate or fibrous state. One type of PTFE may be used alone, or two or more types of PTFE may be used in combination.

In the case that the electrode catalyst layer contains PTFE, the amount of the PTFE is preferably 0.001 to 20% by mass, more preferably 0.01 to 10% by mass, and most preferably 0.1 to 5% by mass, to the whole mass of the electrode catalyst layer. For improved hydrophilicity, the electrode catalyst layer of the present invention may further contain a metal oxide. In this case, the metal oxide is not particularly limited, and is preferably at least one metal oxide selected from the group consisting of $Al_2O_3$, $B_2O_3$, MgO, $SiO_2$, $SnO_2$, $TiO_2$, $V_2O_5$, $WO_3$, $Y_2O_3$, $ZrO_2$, $Zr_2O_3$, and $ZrSiO_4$. In particular, the metal oxide is preferably at least one metal oxide selected from the group consisting of $Al_2O_3$, $SiO_2$, $TiO_2$, and $ZrO_2$. Particularly preferable is $SiO_2$.

In the case that the electrode catalyst layer contains a metal oxide in the embodiments of the present invention, the amount of the metal oxide is preferably 0.001 to 20% by mass, more preferably 0.01 to 10% by mass, and most preferably 0.1 to 5% by mass, to the whole mass of the electrode catalyst layer. The metal oxide may be in a particulate or fibrous state; in particular, it is preferably in an infinite form. The term "infinite form" herein means a form that neither particulate nor fibrous metal oxide is found under optical microscope or electron microscope observation. Even though the electrode catalyst layer is observed under several hundred thousand times magnification using a scanning electron microscope (SEM), neither particulate nor fibrous metal oxide is observed. Further, even though the electrode catalyst layer is observed under several hundred thousand to several million times magnification using a transmission electron microscope (TEM), neither particulate nor fibrous metal oxide is clearly observed. As mentioned here, the term "infinite form" herein means that neither particulate nor fibrous metal oxide is observed with the current microscope technology.

Use of the aforementioned electrode catalyst layer enables to suppress flooding and to generate high power. This is presumably because, in this case, the water content is low and the electrode is excellent in draining performance.

(Method for Producing Electrode Catalyst Layer)

The following will describe a method for producing an electrode catalyst layer. The present invention also relates to a method for producing an electrode catalyst layer, the method comprising the steps of: dispersing composite particles comprising a catalyst metal and a conductive agent in the electrolyte emulsion to prepare an electrode catalyst composition; applying the electrode catalyst composition to a substrate; and drying the electrode catalyst composition applied to the substrate to provide an electrode catalyst layer. The present invention further relates to an electrode catalyst layer obtainable by this production method. For example, the electrode catalyst layer may be produced as follows: an electrolyte emulsion is prepared; the composite particulate substance is dispersed into this electrolyte emulsion to prepare an electrode catalyst composition; this composition is applied to a polymer electrolyte membrane or to another substrate such as a PTFE sheet; and the applied composition is dried and solidified. In the present invention, the electrode catalyst composition can be applied by any conventionally known method such as screen printing or spraying. The electrode catalyst composition contains a fluoropolymer electrolyte, a composite particulate substance, and an aqueous medium.

The electrode catalyst composition may further contain a solvent, if necessary. Examples of the solvent to be used include single solvents such as water, alcohols (e.g. ethanol, 2-propanol, ethylene glycol, and glycerin), and chlorofluorocarbons, and composite solvents thereof. The amount of the solvent is preferably 0.1 to 90% by mass, more preferably 1 to 50% by mass, and most preferably 5 to 20% by mass, to the whole mass of the electrode catalyst composition.

On the other hand, the electrode catalyst layer of the present invention may also be produced as follows: the electrode catalyst composition is applied to a gas diffusion electrode formed by stacking a gas diffusion layer and an electrode catalyst layer, such as ELAT (registered trademark, BASF), or the gas diffusion electrode is immersed in the electrode catalyst composition so that the composition is applied to the electrode; and the composition is dried and solidified.

In addition, the electrode catalyst layer may be immersed in an inorganic acid such as hydrochloric acid after the production. The acid-treatment temperature is preferably 5° C. to 90° C., more preferably 10° C. to 70° C., and most preferably 20° C. to 50° C.

A unit in which two types of electrode catalyst layers, an anode and a cathode, are joined to the respective faces of the electrolyte membrane is called a membrane electrode assembly (hereinafter, also referred to as "MEA"). A membrane electrode assembly comprising the electrolyte membrane of the present invention is also one aspect of the present invention. Further, a membrane electrode assembly comprising the electrode catalyst layer of the present invention is also one aspect of the present invention. A unit in which a pair of gas diffusion layers are oppositely joined to the outer faces of the electrode catalyst layers is also called an MEA in some cases.

The MEA obtained as mentioned above, in some cases the MEA with a pair of gas diffusion electrodes oppositely joined, is assembled with other components used for common polymer electrolyte fuel cells, such as a bipolar plate and a bucking plate, and thereby a polymer electrolyte fuel cell is formed.

A bipolar plate is a plate made of a composite material of graphite and resin, or a metal, and grooves are formed on its surface as passages for fuels and gases, such as an oxidant. The bipolar plate has functions as a transmitter of electrons to an outside load circuit and a channel for supplying fuels and oxidants to the vicinity of the electrode catalyst. A fuel cell is produced by inserting MEAs between such bipolar plates and stacking them.

An electrolyte membrane can be produced as follows: the electrolyte emulsion of the present invention is mixed with an organic solvent to prepare an electrolyte solution with the fluoropolymer electrolyte dissolved therein; this electrolyte solution is applied to a substrate; the electrolyte solution applied to the substrate is dried to form an electrolyte membrane; and the electrolyte membrane is peeled off from the substrate to provide an electrolyte membrane. Further, an electrode catalyst layer can be produced as follows: the electrolyte emulsion of the present invention is mixed with an organic solvent to prepare an electrolyte solution with the fluoropolymer electrolyte dispersed therein; a composite particulate substance containing a catalyst metal and a conductive agent is dispersed into this electrolyte solution to prepare an electrode catalyst composition; the electrode catalyst composition is applied to a substrate; and the electrode catalyst composition applied to the substrate is dried to form an electrode catalyst layer.

In the case of first preparing an electrolyte solution and then producing an electrolyte membrane or an electrode catalyst layer, a method called casting film formation can be used. Examples thereof include a method in which a polymer electrolyte solution is developed on a container such as a laboratory dish; the emulsion is, if necessary, heated in an oven, for example, so that the solvent is at least partially distilled off; and the dried emulsion is, for example, separated from the container, so that a film-shaped product is obtained. Examples thereof further include a method in which a polymer electrolyte solution is cast on a substrate such as a glass plate or a film in a manner such that the thickness is uniform using a device such as a blade coater, gravure coater, or comma coater having a mechanism such as a blade, air knife, or reverse roll, so that a sheet-formed film is obtained. In addition, examples thereof may include a method in which a film is continuously cast-formed, so that a long film-shaped membrane is obtained.

The film is not particularly limited. The film may be prepared from a material selected from polyesters including polyethylene terephthalate (PET), polybutylene terephthalate (PBT), polyethylene naphthalate (PEN) and liquid crystal polyesters, triacetyl cellulose (TAC), polyarylate, polyether, polycarbonate (PC), polysulfone, polyethersulfone, cellophane, aromatic polyamide, polyvinyl alcohol, polyethylene (PE), polypropylene (PP), polyvinyl chloride (PVC), polystyrene (PS), acrylonitrile-butadiene-styrene copolymer (ABS), polymethyl methacrylate (PMMA), polyamide, polyacetal (POM), polyphenylene terephthalate (PPE), polybutylene terephthalate (PBT), polyphenylene sulfide (PPS), polyamide-imide (PAI), polyether imide (PEI), polyether ether ketone (PEEK), polyimide (PI), polymethyl pentene (PMP), polytetrafluoroethylene (PTFE), fluorinated ethylene-propylene (FEP), tetrafluoroethylene-ethylene (ETFE) copolymer, polyvinylidene fluoride (PVDF), polybenzazole (PBZ), polybenzoxazole (PBO), polybenzothiazole (PBT), polybenzimidazole (PBI), and poly-paraphenylene terephthalamide (PPTA).

Examples of the organic solvent include protonic organic solvents such as methanol, ethanol, n-propanol, isopropyl alcohol, butanol, and glycerin, and non-protonic solvents such as N,N-dimethyl formamide, N,N-dimethyl acetamide, and N-methyl pyrrolidone. Each of these may be used alone, or two or more of these may be used in combination.

The dissolution method is not particularly limited. For example, a mixed solvent of water and a protonic organic solvent is first added to an electrolyte emulsion under the conditions such that the total solids concentration is 1 to 50% by mass. Next, this composition is charged into an autoclave which may optionally have an inner cylinder made of glass. The air inside the autoclave is replaced with an inert gas such as nitrogen, and then the composition is heated and stirred at an internal temperature of 50° C. to 250° C. for 1 to 12 hours. Thereby, an electrolyte solution is provided. The total solids concentration is preferably as high as possible in terms of yield, but too high a concentration may cause undissolved material. Thus, the concentration is preferably 1 to 50% by mass, more preferably 3 to 40% by mass, and further preferably 5 to 30% by mass.

If a protonic organic solvent is used, the ratio of the protonic organic solvent to water in the obtained electrolyte solution may be appropriately adjusted depending on the dissolution method, dissolution conditions, type of a polymer electrolyte, total solids concentration, dissolution temperature, stirring rate, and the like. The amount of the protonic organic solvent is preferably 10 to 1,000 parts by mass for 100 parts by mass of water, and the ratio of the organic solvent is particularly preferably 10 to 500 parts by mass for 100 parts by mass of water.

The electrolyte solution contains one or more types of emulsions (liquid particles are dispersed in a liquid as colloidal particles or coarser particles to give a milk-like appearance), suspensions (solid particles are dispersed in a liquid as colloidal particles or particles which can be observed using a microscope), colloidal liquids (macromolecules are dispersed), and micellar liquids (a large amount of small molecules associate with each other by intermolecular force to form a lyophilic colloidal dispersion system).

The electrolyte solution may be concentrated. The concentration method is not particularly limited. For example, the solution may be heated so that the solvent is distilled off, or the solution may be concentrated under reduced pressure. With respect to the solids content in the resulting coating solution, too high a content may cause high viscosity and poor handleability, while too low a content may cause low productivity. Thus, the final solids content in the coating solution is preferably 0.5 to 50% by mass.

More preferably, the electrolyte solution is filtered in order to remove a coarser particle fraction. The filtration method is not particularly limited, and any conventional general method can be applied. Typical examples thereof include a method in which a filter material showing a standard filter rating for ordinary use is processed into a filter, and the solution is filtered under pressure using this filter. With respect to the filter, the filter material preferably has a 90% collection particle size of 10 to 100 times as large as the average particle size of the particles. This filter material may be a filter paper, or may be a sintered metallic filter. Particularly in the case of the filter paper, the 90% collection particle size is preferably 10 to 50 times as large as the average particle size of the particles. In the case of the sintered metallic filter, the 90% collection particle size is preferably 50 to 100 times as large as the average particle size of the particles. A 90% collection particle size set to 10 or more times as large as the average particle size enables to suppress an excessive increase in the pressure required for liquid delivery and to suppress clogging of the filter within a short time. On the other hand, a 90% collection particle size is preferably set to 100 or less times as large as the average particle size so as to well remove aggregated particles and undissolved resin, which may cause contamination in a film.

EXAMPLES

The following will describe the present embodiments in detail referring to examples. The present embodiments are not limited to these examples.

The evaluation methods and measurement methods used in the present embodiments are as follows.
(EW Measurement)

About 2 to 20 cm$^2$ of the polymer electrolyte membrane in which counter ions of the ion-exchange group were protons was immersed in a saturated NaCl aqueous solution (30 ml) at 25° C., and the mixture was left for 30 minutes under stirring. Then, the protons in the saturated NaCl aqueous solution were neutralization-titrated with a 0.01 N sodium hydroxide aqueous solution using phenolphthalein as an indicator. The polymer electrolyte membrane obtained after the neutralization in which the counter ions of the ion-exchange group were sodium ions was washed with pure water, vacuum-dried, and weighed. Assuming that the amount of substance of the sodium hydroxide used for neutralization was M (mmol), and that the weight of the polymer electrolyte membrane in which the counter ions of the ion-exchange group were sodium ions was represented as W (mg), the equivalent weight (EW) (g/eq) was determined by the following formula (2).

$$EW=(W/M)-22 \qquad (2)$$

(Calculation of Cluster Distance)

The polymer electrolyte membranes were stacked so that the total thickness was about 0.25 mm, and the laminated sample was mounted on a humidity-controllable cell for small-angle X-ray scattering. The sample was maintained under the conditions of 25° C. and 50% RH for 30 minutes. X-rays were applied thereto and the scattering state was measured. The measurement conditions were as follows: X-ray wavelength λ: 0.154 nm, camera length: 515 mm; and detector: imaging plate. The two-dimensional scattering pattern obtained by the imaging plate was adjusted by empty-cell correction and background correction based on the detector, and then subjected to circular averaging. Thereby, a one-dimensional scattering profile was obtained. In the scattering profile wherein scattering intensities are plotted with respect to Bragg angles θ, the Bragg angle θm at the peak position derived from the cluster structure within the range of 2θ>1° was read and the distance between ionic clusters was calculated by the following formula (1).

$$d=\lambda/2/\sin(\theta m) \qquad (1)$$

(Measurement of Proton Conductivity)

The proton conductivity was measured as follows using an MSB-AD-V-FC polymer membrane water content test apparatus (BEL Japan Inc.). A polymer electrolyte membrane formed with a thickness of 50 μm was cut out into a size of 1 cm in width and 3 cm in length, and this sample was mounted on a cell for conductivity measurement. Next, the cell for conductivity measurement was placed in a chamber of the tester, and the conditions in the chamber were adjusted to 110° C. and lower than 1% RH. Then, water vapor generated from ion exchange water was introduced into the chamber so that the inside of the chamber was humidified to 10% RH, 30% RH, 50% RH, 70% RH, 90% RH, and 95% RH, in this order. The conductivities at the respective humidities were measured.

The humidity H at 0.10 S/cm was calculated based on the following formula (3):

$$H=(H2-H1)/(\sigma2-\sigma1)\times(0.1-\sigma1)+H1 \qquad (3)$$

provided that H2 and σ2 are the relative humidity and the conductivity, respectively, at the measurement point first after the conductivity excesses 0.10 S/cm, and that H1 and σ1 are the highest relative humidity at the measurement point before the conductivity excesses 0.10 S/cm and the conductivity at that point.
(Method for Measuring Melt-Flow Rate [MFR])

The MFR of the fluoropolymer was measured under the conditions of 270° C. and a load of 2.16 kg in accordance with JIS K 7210 using MELT INDEXER TYPE C-5059D (Toyo Seiki Seisaku-sho, Ltd.). The amount of the polymer pushed out was represented as grams for 10 minutes.
(Polymer Composition)

The polymer composition was calculated based on the measured value by high-temperature NMR at 300° C. The NMR was performed using a Fourier transform nuclear magnetic resonance (FT-NMR) device AC 300P (Bruker Corporation). The polymer composition was calculated using the peak intensity at around −120 ppm derived from tetrafluoroethylene and vinyl ether and the peak intensity at around −80 ppm derived from vinyl ether and based on the respective peak integral values.
(Measurement of Average Particle Size and Aspect Ratio)

The average particle size and the aspect ratio were determined as follows: the electrolyte emulsion was applied to an aluminum foil or the like substrate, and then the aqueous medium was removed so that an aggregate of the fluoropolymer electrolyte was obtained; this aggregate was observed using a scanning electron microscope or the like, and thereby an image was obtained; on the obtained image, 20 or more particles each were measured for the lengths of its major and minor axes; the average value of the length ratios (major axis/minor axis) was treated as the aspect ratio, and the average value of the lengths of the major and minor axes was treated as the average particle size.
(Method for Measuring Solids Concentration)

A dried weighing bottle at room temperature was precisely weighed, and the obtained weight was called W0. A 10-g portion of a material to be measured was put into the weighed bottle and the total weight was precisely weighed. This weight was called W1. The weighing bottle with the material put therein was dried for 3 hours or longer at a temperature of 110° C. and an absolute pressure of 0.01 MPa or lower using an LV-120 type vacuum drier (ESPEC Corp.), and then cooled down in a silica-gel-charged desiccator. After the temperature reached room temperature, the weight was precisely measured, and this weight was called W2. The ratio (W2−W0)/(W1−W0) was represented in percentage. The measurement was performed 5 times, and the average value thereof was treated as the solids concentration.
Measurement of Ratio (the Number of SO$_2$F Groups)/(the Number of SO$_3$Z Groups)

The IR measurement was performed on a film formed by heat-pressing the precursor and a cast membrane formed from the obtained electrolyte emulsion, and thereby the ratio was measured.
(Method for Measuring 25° C. Water Content)

A polymer electrolyte membrane formed with a thickness of about 50 μm was stored for 1 hour in a constant-temperature and constant-humidity room controlled at 23° C. and 50% RH, and then cut out into a size of 3 cm in length and 4 cm in width. Next, a SUS304-made container filled with ion exchange water was immersed in a water bath THERMAL ROBO TR-2A (AS ONE Corporation) similarly filled with ion exchange water, so that the temperature of the ion exchange water in the SUS304-made container was 25° C. After the ion exchange water reached 25° C., the aforementioned polymer electrolyte membrane was immersed in the water. At this time, a polytetrafluoroethylene mesh or the like may also be immersed therein on the polymer electrolyte membrane in order to prevent floating up of the polymer electrolyte membrane. After 1-hour immersion, the polymer electrolyte membrane was taken out from the water and the water on the surface was wiped using a filter paper (Cat No. 1441 125, Whatman Ltd.). Then, the weight MW of the polymer electrolyte membrane containing water was measured to the order of 0.0001 g using an electronic balance GR-202 (A&D Company, Limited). At this time, in order to prevent excessive drying of the polymer electrolyte membrane, the weight was measured within 10 seconds after the membrane was taken out from the water. Thereafter, the polymer electrolyte membrane was dried at 160° C. for 1 hour using a hot-air drier SPH-101 (ESPEC Corporation), and the weight MD of the dried polymer electrolyte membrane was measured using the electronic balance. The ratio (MW-MD)/MD was represented in percentage, and this value was treated as the 25° C. water content.

(Fuel Cell Evaluation)

In order to examine the cell characteristics (hereinafter referred to as "initial characteristics") of the electrode catalyst layer and the membrane electrode assembly (MEA) produced as mentioned below, the following fuel cell evaluation was performed.

First, an anode-side gas diffusion layer and a cathode-side gas diffusion layer were placed opposite to each other and the MEA produced as follows was placed therebetween, and thereby the MEA was assembled into an evaluation cell. Carbon cloth (DE NORA NORTH AMERICA (USA), ELAT (registered trademark) B-1) was used as the gas diffusion layer on each of the anode and cathode sides. Next, this evaluation cell was mounted on an evaluation device (CHINO Corporation) and heated to 80° C., and then hydrogen gas was flowed to the anode side at a rate of 300 cc/min and air gas to the cathode side at 800 cc/min. These gases were previously humidified. That is, the hydrogen gas and the air gas were humidified at a desired temperature by water-bubbling, and then supplied to the evaluation cell. The evaluation cell was maintained at a voltage of 0.6 V for 20 hours under the conditions of a cell temperature of 80° C. and a desired humidity, and the current was measured.

Example 1

(1.1) Polymerization Step

A fluoroelectrolyte emulsion having repeating units derived from $CF_2=CF_2$ and $CF_2=CF-O-(CF_2)_2-SO_3H$ with an EW of 455 was prepared as follows.

A 6-L-capacity SUS316-made pressure-resistant container provided with a stirring wing and a temperature-controlling jacket was charged with water purified by reverse osmosis membrane (2,850 g), $C_7F_{15}COONH_4$ (150 g), and $CF_2=CFOCF_2CF_2SO_2F$ (1,150 g). The air inside the system was replaced with nitrogen, and then the container was evacuated. Subsequently, TFE was introduced therein until the internal pressure reached 0.07 MPaG. The mixture was stirred at 400 rpm, and the temperature was controlled so that the internal temperature was 10° C. A solution of $(NH_4)_2S_2O_8$ (6 g) in water (20 g) was injected therein, and a solution of $Na_2SO_3$ (0.6 g) in water (20 g) was further injected therein, so that polymerization was initiated. TFE was additionally put so as to maintain the internal pressure at 0.07 MPaG, and the polymerization was continued. Further, a solution of $Na_2SO_3$ (0.6 g) in water (20 g) was injected therein every 1 hour.

After 11 hours from the polymerization initiation, that is, at the time when 400 g in total of TFE was additionally put, TFE was released from the pressure and the polymerization was stopped. Thereby, 4,700 g of a polymerization liquid (precursor emulsion) was obtained. The obtained precursor emulsion had a solids concentration of 24.0% by mass.

Water (250 g) was added to a 200-g portion of the obtained polymerization liquid, and the mixture was further mixed with nitric acid to be coagulated. The coagulated polymer was filtered, and re-dispersion in water and filtration was repeated 3 times. Then, the polymer was dried at 90° C. for 24 hours and subsequently at 120° C. for 5 hours using a hot-air drier. Thereby, 44.3 g of a polymer (fluoroelectrolyte precursor) was obtained. The obtained polymer has an MFR of 0.4 g/10 min.

(1.2) Hydrolysis Step

A 2-kg portion of the polymerization liquid (precursor emulsion) obtained in the step (1.1) was diluted 2-fold with pure water. The liquid was put into a 10-L-capacity three-neck flask and stirred therein. The temperature was adjusted to 80° C., and the pH was kept at 10 or higher while 10% by mass of a sodium hydroxide aqueous solution was dropwise added. Thereby, $—SO_2F$ of the fluoropolymer was hydrolyzed. Although reduction in the pH was no longer observed after 3-hour hydrolysis, the hydrolysis was continued for another 2 hours, and then stopped. No deposition of the fluoropolymer was visually observed during the hydrolysis.

(1.3.1) Ultrafiltration Step

Dilute sulfuric acid was added to the reaction solution obtained in the step (1.2) so that the pH was adjusted to 8, and the solution was ultrafiltered using an ultrafiltration device (Millipore Corporation). The ultrafiltration membrane was one having a molecular weight cutoff of 10,000 (Millipore Corporation, Pelicon 2 Filter). This membrane was inserted in a stainless-steel holder (Millipore Corporation), and thus an ultrafiltration unit was prepared. The reaction solution obtained in the step (1.2) was put into a 10-L beaker, and was supplied to the ultrafiltration unit through a liquid delivery pump (Millipore Corporation, easy-load Master Flex 1/P). A filtrate containing foreign matter was discharged from the system, and the treated liquid was returned to the beaker. Purified water in an amount equivalent to that of the removed filtrate was appropriately added to the beaker and ultrafiltration was performed again. The addition of pure water was stopped when the electric conductivity of the filtrate reached 10 $\mu S \cdot cm^{-1}$, and the ultrafiltration was stopped when the amount of the treated liquid reached 1 L. Thereby, an aqueous dispersion A was obtained. The electric conductivity was measured using an electric conductivity meter Twin Cond B-173 (HORIBA, Ltd.). The ultrafiltration treatment was continued for 5 hours.

(1.3.2) Ion Exchange

Amberlite IR120B (200 g) (Rohm & Haas Company) was converted into an acid type using sulfuric acid, sufficiently washed with pure water, and charged into a glass burette. The aqueous dispersion obtained in the step (1.3.1) (200 g) was passed through the burette over 1 hour, and thereby an acid-type aqueous dispersion B (electrolyte emulsion) was obtained. The obtained electrolyte emulsion had a solids concentration of 12.5% by mass, and a viscosity of 20.8 mPa·s measured at 25° C. and a shear rate of 20.4 s$^{-1}$ using a B-type viscometer. The ratio (the number of $SO_2F$ groups)/(the number of $SO_3Z$ groups) was 0. The fluoropolymer electrolyte had an average particle size of 42 nm and an aspect ratio of 1.0.

(1.4) Film Formation

The acid-type aqueous dispersion B obtained in the step (1.3.2) was developed on a glass laboratory dish. The dispersion was heat-dried at 80° C. for 30 minutes using NEO HOT PLATE HI-1000 (AS ONE Corporation), and thereby the solvent was removed. The dispersion was further heat-treated at 160° C. for 1 hour. Thereafter, the heated dispersion was immersed in 25° C. ion exchange water and separated from the glass laboratory dish. Thereby, a fluoropolymer electrolyte membrane having a thickness of about 50 μm was obtained. No crease was observed on the obtained electrolyte membrane.

This fluoropolymer electrolyte membrane had an EW of 455.

(1.5) Ion Conductivity, Cluster Distance, and 25° C. Water Content

The fluoropolymer electrolyte membrane obtained in the step (1.4) had a distance between ionic clusters of 2.3 nm and ion conductivities of 0.10 S/cm at 110° C. and 25% RH and 0.20 S/cm at 110° C. and 50% RH. Further, the 25° C. water content was 160%; this water content was lower than that of the electrolyte membrane in Comparative Example 1 which was produced from the fluoropolymer electrolyte solution.

(1.6) Production of Electrode Catalyst Layer 1

An electrode catalyst layer was prepared as follows: an electrolyte solution (0.825 g) (trade name: SS 700C/20, Asahi Kasei E-materials Corp., polymer weight ratio: 20.0 wt %, solvent:water) comprising a fluoropolymer electrolyte having an EW of 720 and ethanol (8.175 g) were added to a platinum-supporting catalyst TEC10E40E (0.4 g) (Tanaka Kikinzoku Kogyo K.K., platinum content: 40 wt %), and they were mixed and stirred so that the mixture was formed into an ink state; the ink-state mixture was applied to a PTFE sheet by screen printing; and the applied mixture was dried and solidified under air atmosphere at 160° C. for 1 hour. The platinum content of this electrode catalyst layer was 0.17 mg/cm$^2$ in an anode electrode and 0.32 mg/cm$^2$ in a cathode electrode.

(1.7) Production of Electrode Catalyst Layer 2

An electrode catalyst layer was prepared as follows: the acid-type aqueous dispersion B obtained in the step (1.3.2) was diluted with ion exchange water and ethanol to prepare a liquid (polymer weight ratio: 5.5 wt %, solvent composition (mass ratio): ethanol/water=50/50); a 3.0-g portion of this liquid and ethanol (6.0 g) were added to a platinum-supporting catalyst TEC10E40E (0.4 g) (Tanaka Kikinzoku Kogyo K.K., platinum content: 40 wt %), and they were mixed and stirred so that the mixture was formed into an ink state; the ink-state mixture was applied to a PTFE sheet by screen printing; and the applied mixture was dried and solidified under air atmosphere at 160° C. for 1 hour. The platinum content of this electrode catalyst layer was 0.17 mg/cm$^2$ in an anode electrode and 0.32 mg/cm$^2$ in a cathode electrode.

(1.8) Production of Membrane Electrode Assembly (MEA 1)

The anode electrode and cathode electrode both produced in the step (1.6) were placed opposite to each other, and the fluoropolymer electrolyte membrane produced in the step (1.4) was placed therebetween. They were hot-pressed under the conditions of 180° C. and a surface pressure of 0.1 MPa, so that the anode electrode and the cathode electrode were printed and joined to the polymer electrolyte membrane. Thereby, an MEA 1 was produced.

(1.9) Production of Membrane Electrode Assembly (MEA 2)

The anode electrode and cathode electrode both produced in the step (1.7) were placed opposite to each other, and a polymer electrolyte membrane (trade name: Aciplex SF7202, Asahi Kasei E-materials Corp.) was placed therebetween. They were hot-pressed under the conditions of 180° C. and a surface pressure of 0.1 MPa, so that the anode electrode and the cathode electrode were printed and joined to the polymer electrolyte membrane. Thereby, an MEA 2 was produced.

(1.10) Fuel Cell Evaluation (MEA 1)

The fuel cell evaluation was performed as mentioned above on the MEA 1 produced in the step (1.8). As a result, the current density was as high as 0.57 A/cm$^2$ after the MEA was maintained at a voltage of 0.6 V for 20 hours under the conditions of a cell temperature of 80° C. and the 50° C. saturated vapor pressure (corresponding to humidity 26% RH).

(1.11) Fuel Cell Evaluation (MEA 2)

The fuel cell evaluation was performed as mentioned above on the MEA 2 produced in the step (1.9). As a result, the current density was as high as 0.49 A/cm$^2$ after the MEA was maintained at a voltage of 0.6 V for 20 hours under the conditions of a cell temperature of 80° C. and the 50° C. saturated vapor pressure (corresponding to humidity 26% RH).

Comparative Example 1

The fluoroelectrolyte precursor obtained in the step (1.1) of Example 1 was brought into contact with an aqueous solution of potassium hydroxide (15% by mass) and methyl alcohol (50% by mass) at 80° C. for 20 hours, and was thereby hydrolyzed. In the present step, the fluoropolymer electrolyte absorbed the aqueous solution in an amount about 13.7 times as large as the dried weight of the fluoroelectrolyte precursor. Therefore, its volume remarkably increased and the electrolyte became brittle and crumbly. Then, the electrolyte was immersed in water at 60° C. for 5 hours, so that the above aqueous solution was removed from the fluoroelectrolyte. Thereafter, treatment of immersing the electrolyte into a 60° C. 2 N hydrochloric acid for 1 hour was repeated 5 times, with the hydrochloric acid exchanged at every treatment. Ion exchange water was then put thereinto, the fluoropolymer electrolyte was left for 5 hours such that the electrolyte was not collapsed, and the supernatant fluid was removed. This treatment was repeated until the pH of the discharged water was 5 or higher. Also in this step, the fluoropolymer electrolyte absorbed ion exchange water in an amount about 28.0 times as large as the dried weight of the fluoroelectrolyte precursor. Therefore, its volume remarkably increased. The fluoroelectrolyte treated as mentioned above was carefully recovered and then dried. Thereby, a fluoropolymer electrolyte was obtained.

This fluoropolymer electrolyte was put into a 5-L autoclave together with an ethanol aqueous solution (water:ethanol=50.0:50.0 (mass ratio)) and the autoclave was hermetically sealed. The mixture was heated to 160° C. under stirring with a wing, and was maintained for 5 hours. Then, the autoclave was naturally cooled down, and a uniform fluoropolymer electrolyte solution (viscosity: 400 mPa·s) having a solids concentration of 5% by mass was produced.

This fluoropolymer solution was concentrated at 80° C. under reduced pressure, and thereby a cast solution having a solids concentration of 20% by mass was obtained. This cast solution was cast on a tetrafluoroethylene film using a doctor blade. The solution was pre-dried in an oven at 60° C. for 30 minutes, and then dried at 80° C. for 30 minutes, so that the solvent was removed. The dried product was further heated at 160° C. for 1 hour, and thereby a fluoropolymer electrolyte membrane having a thickness of about 50 µm was obtained.

This fluoropolymer electrolyte membrane had an EW of 455, and a distance between ionic clusters of 2.3 nm. The ion conductivities were 0.10 S/cm at 110° C. and 25% RH and 0.20 S/cm at 110° C. and 50% RH. Further, the 25° C. water content was 180%.

Except that the above fluoropolymer electrolyte membrane was used, an MEA was produced in the same manner as in the step (1.8) of Example 1, and the fuel cell evaluation was performed. As a result, the current density was 0.57 A/cm$^2$ after the MEA was maintained at a voltage of 0.6 V for 20 hours under the conditions of a cell temperature of 80° C. and the 50° C. saturated vapor pressure (corresponding to humidity 26% RH).

Except that the above fluoropolymer electrolyte solution (0.825 g) and ethanol (8.175 g) were used instead of the acid-type aqueous dispersion B, an electrode catalyst layer was produced in the same manner as in the step (1.7) of Example 1. Except that this electrode catalyst layer was used, an MEA was produced in the same manner as in the step (1.9) of Example 1, and the fuel cell evaluation was performed. As a result, the current density was 0.46 A/cm$^2$ after the MEA was maintained at a voltage of 0.6 V for 20 hours under the conditions of a cell temperature of 80° C. and the 50° C. saturated vapor pressure (corresponding to humidity 26% RH). The obtained current density was not so high as that in Example 1.

Comparative Example 2

A fluoroelectrolyte having repeating units derived from $CF_2=CF_2$ and $CF_2=CF—O—(CF_2)_2—SO_3H$ with an EW of 720 was produced as follows.

A 189-L-capacity SUS316-made pressure-resistant container provided with a stirring wing and a temperature-controlling jacket was charged with water purified by reverse osmosis membrane (90.5 kg), $C_7F_{15}COONH_4$ (0.945 g), and $CF_2=CFOCF_2CF_2SO_2F$ (5.68 kg). The air inside the system was replaced with nitrogen and then the container was evacuated. Subsequently, TFE was introduced therein until the internal pressure reached 0.2 MPaG. The temperature was controlled under stirring at 189 rpm so that the internal temperature was 47° C., and $CF_4$ of 0.1 MPaG as an explosion inhibitor was introduced. Thereafter, TFE was additionally introduced so that the internal pressure was 0.70 MPaG. A solution of $(NH_4)_2S_2O_8$ (47 g) in water (3 L) was introduced into the system, and thereby polymerization was initiated. Thereafter, TFE was added so as to maintain the internal pressure at 0.7 MPaG. For every 1 kg of TFE, 0.7 kg of $CF_2=CFOCF_2CF_2SO_2F$ was supplied so that the polymerization was continued.

After 360 minutes from the polymerization initiation, that is, at the time when 24 kg in total of TFE was additionally introduced, the TFE was released from the pressure and the polymerization was stopped. The obtained polymerization liquid (140 kg) was mixed with water (200 kg), and further mixed with nitric acid to be coagulated. The coagulated polymer was centrifuged, and ion exchange water was flowed therethrough so that the polymer was washed. Thereafter, the polymer was dried at 90° C. for 24 hours and subsequently at 150° C. for 24 hours using a hot-air drier. Thereby, 34 kg of a polymer was obtained.

A 28-kg portion of the polymer was rapidly charged into a 50-L Hastelloy vibrating reactor (OKAWARA MFG. CO., LTD.). The polymer was heated to 100° C. while vibrated at a vibration number of 50 rpm under evacuation. Then, nitrogen was introduced therein until the gauge pressure reached −0.05 MPaG. Thereafter, a gaseous halogenating agent which was prepared by diluting $F_2$ gas to 20% by mass with nitrogen gas was introduced into the reactor until the gauge pressure reached 0.0 MPaG, and the system was maintained for 30 minutes.

The gaseous halogenating agent inside the reactor was discharged and the reactor was evacuated. Then, a gaseous halogenating agent prepared by diluting $F_2$ gas to 20% by mass with nitrogen gas was introduced therein until the gauge pressure reached 0.0 MPaG, and the system was maintained for 3 hours.

The system was cooled down to room temperature and the gaseous halogenating agent inside the reactor was discharged. After vacuum and nitrogen introduction were repeated 3 times, the reactor was released. Thereby, 28 kg of a polymer (fluoropolymer electrolyte) was obtained.

The obtained polymer had an MFR of 3.0 g/10 min, and contained 18 mol % of a repeating unit derived from the $SO_3H$ group-containing monomer.

Except that this fluoropolymer electrolyte was used, a fluoropolymer electrolyte solution and a fluoropolymer electrolyte membrane were produced and the EW, ion-cluster distance, and conductivity were measured in the same manner as in Comparative Example 1. As a result, the EW was 720 and the distance between ionic clusters was 3.1 nm. The conductivity was 0.06 S/cm at 110° C. and 50% RH; that is, a desired high conductivity was not achieved.

Except that the above fluoropolymer electrolyte membrane was used, an MEA was produced in the same manner as in the step (1.10) of Example 1, and the fuel cell evaluation was performed. As a result, the current density was 0.25 A/cm$^2$ after the MEA was maintained at a voltage of 0.6 V for 20 hours under the conditions of a cell temperature of 80° C. and the 50° C. saturated vapor pressure (corresponding to humidity 26% RH); that is, a high current density was not achieved.

Except that the above fluoropolymer electrolyte solution was used, an electrode catalyst layer and an MEA were produced in the same manner as in the step (1.11) of Example 1, and the fuel cell evaluation was performed. As a result, the current density was 0.25 A/cm$^2$ after the MEA was maintained at a voltage of 0.6 V for 20 hours under the conditions of a cell temperature of 80° C. and the 50° C. saturated vapor pressure (corresponding to humidity 26% RH); that is, a high current density was not achieved.

Example 2

Except that the amount of $CF_2$=$CFOCF_2CF_2SO_2F$ was changed from 1,150 g to 1,300 g and TFE was added in order to maintain the internal pressure at 0.02 MPaG so that the polymerization was continued, a fluoropolymer electrolyte emulsion having repeating units derived from $CF_2$=$CF_2$ and $CF_2$=$CF$—$O$—$(CF_2)_2$—$SO_3H$ with an EW of 399 was produced in the same manner as in Example 1. After 16 hours from the polymerization initiation, that is, at the time when 323 g in total of TFE was additionally introduced, the TFE was released from the pressure and the polymerization was stopped. Thereby, 4,570 g of a polymerization liquid (precursor emulsion) was obtained.

The precursor polymer obtained in the same manner as in Example 1 had an MFR of 15.6 g/10 min.

The fluoropolymer electrolyte emulsion contained 45.2 mol % of a repeating unit derived from the $SO_3H$ group-containing monomer of the fluoropolymer electrolyte. The fluoropolymer electrolyte had an average particle size of 50 nm and an aspect ratio of 1.0. The ratio (the number of $SO_2F$ groups)/(the number of $SO_3Z$ groups) was 0.

Thereafter, a fluoropolymer electrolyte membrane and an electrode catalyst layer were produced in the same manner as in Example 1. The fluoropolymer electrolyte membrane had an EW of 399, a distance between ionic clusters of 2.3 nm, and ion conductivities of 0.10 S/cm at 110° C. and 23% RH and 0.22 S/cm at 110° C. and 50% RH. Further, the 25° C. water content was 210%. The platinum content of the electrode catalyst layer was 0.17 mg/cm$^2$ in an anode electrode and 0.32 mg/cm$^2$ in a cathode electrode. In the fuel cell evaluation performed in the same manner as in the step (1.10) of Example 1 except that the above electrolyte membrane was used, the current density was 0.61 A/cm$^2$ after the MEA was maintained at a voltage of 0.6 V for 20 hours under the conditions of a cell temperature of 80° C. and the 50° C. saturated vapor pressure (corresponding to humidity 26% RH). Further, in the fuel cell evaluation performed in the same manner as in the step (1.11) of Example 1 except that the above electrode catalyst layer was used, the current density was 0.51 A/cm$^2$ after the MEA was maintained at a voltage of 0.6 V for 20 hours under the conditions of a cell temperature of 80° C. and the 50° C. saturated vapor pressure (corresponding to humidity 26% RH).

Example 3

Except that the internal temperature was controlled to 17.5° C. and TFE was added in order to maintain the internal pressure at 0.09 MPaG so that the polymerization was continued, a fluoroelectrolyte emulsion having repeating units derived from $CF_2$=$CF_2$ and $CF_2$=$CF$—$O$—$(CF_2)_2$—$SO_3H$ with an EW of 470 (MFR of 1.8) was produced in the same manner as in Example 1. After 9 hours from the polymerization initiation, that is, at the time when 401 g in total of TFE was additionally introduced, the TFE was released from the pressure and the polymerization was stopped. Thereby, 4,664 g of a polymerization liquid (precursor emulsion) was obtained.

The precursor polymer obtained in the same manner as in Example 1 had an MFR of 1.8 g/10 min. The fluoropolymer electrolyte emulsion contained 34.2 mol % of a repeating unit derived from the $SO_3H$ group-containing monomer of the fluoropolymer electrolyte. The fluoropolymer electrolyte had an average particle size of 35 nm and an aspect ratio of 1.0. The ratio (the number of $SO_2F$ groups)/(the number of $SO_3Z$ groups) was 0.

Thereafter, except that the obtained fluoroelectrolyte emulsion was used, a fluoropolymer electrolyte membrane and an electrode catalyst layer were produced in the same manner as in Example 1. The fluoropolymer electrolyte membrane had an EW of 470, a distance between ionic clusters of 2.3 nm, and ion conductivities of 0.10 S/cm at 110° C. and 26% RH and 0.18 S/cm at 110° C. and 50% RH. Further, the 25° C. water content was 150%. The platinum content of the electrode catalyst layer was 0.17 mg/cm$^2$ in an anode electrode and 0.32 mg/cm$^2$ in a cathode electrode. In the fuel cell evaluation performed in the same manner as in the step (1.10) of Example 1 except that the above electrolyte membrane was used, the current density was 0.54 A/cm$^2$ after the MEA was maintained at a voltage of 0.6 V for 20 hours under the conditions of a cell temperature of 80° C. and the 50° C. saturated vapor pressure (corresponding to humidity 26% RH). Further, in the fuel cell evaluation performed in the same manner as in the step (1.11) of the example except that the above electrode catalyst layer was used, the current density was 0.48 A/cm$^2$ after the electrode catalyst layer was maintained at a voltage of 0.6 V for 20 hours under the conditions of a cell temperature of 80° C. and the 50° C. saturated vapor pressure (corresponding to humidity 26% RH).

Example 4

Except that the amount of $C_7F_{15}COONH_4$ was changed from 150 g to 60 g, the amount of $CF_2$=$CFOCF_2CF_2SO_2F$ was changed from 1,150 g to 943 g, the internal temperature was controlled to 38° C., and TFE was added in order to maintain the internal pressure at 0.51 MPaG so that the polymerization was continued, a fluoropolymer electrolyte emulsion having repeating units derived from $CF_2$=$CF_2$ and $CF_2$=$CF$—$O$—$(CF_2)_2$—$SO_3H$ with an EW of 527 was produced in the same manner as in Example 1. After 7 hours from the polymerization initiation, that is, at the time when 381 g in total of TFE was additionally introduced, TFE was released from the pressure and the polymerization was stopped. Thereby, 4,260 g of a polymerization liquid (precursor emulsion) was obtained.

The precursor polymer obtained in the same manner as in Example 1 had an MFR of 16 g/10 min. The fluoropolymer electrolyte emulsion contained 29 mol % of a repeating unit derived from the $SO_3H$ group-containing monomer of the fluoropolymer electrolyte. The fluoropolymer electrolyte had an average particle size of 62 nm and an aspect ratio of 1.0. The ratio (the number of $SO_2F$ groups)/(the number of $SO_3Z$ groups) was 0.

Thereafter, except that the obtained fluoroelectrolyte emulsion was used, a fluoropolymer electrolyte membrane and an electrode catalyst layer were produced in the same manner as in Example 1. The fluoropolymer electrolyte membrane had an EW of 527, a distance between ionic clusters of 2.4 nm, and ion conductivities of 0.10 S/cm at 110° C. and 30% RH and 0.14 S/cm at 110° C. and 50% RH. Further, the 25° C. water content was 100%. The platinum content of the electrode catalyst layer was 0.17 mg/cm$^2$ in an anode electrode and 0.32 mg/cm$^2$ in a cathode electrode. In the fuel cell evaluation performed in the same manner as in the step (1.10) of Example 1 except that the above electrolyte membrane was used, the current density was 0.51 A/cm$^2$ after the electrolyte membrane was maintained at a voltage of 0.6 V for 20 hours under the conditions of a cell temperature of 80° C. and the 50° C. saturated vapor pressure (corresponding to humidity 26% RH). Further, in the fuel cell evaluation performed in the same manner as in the step (1.11) of the example except that the above electrode catalyst layer was used, the current density was 0.46 A/cm$^2$ after the electrode catalyst layer was maintained at a voltage of 0.6 V for 20 hours under the conditions of a cell temperature of 80° C. and the 50° C. saturated vapor pressure (corresponding to humidity 26% RH).

Example 5

Except that the amount of $C_7F_{15}COONH_4$ was changed from 150 g to 60 g, the amount of $CF_2\!=\!CFOCF_2CF_2SO_2F$ was changed from 1,150 g to 950 g, the internal temperature was controlled to 38° C., and TFE was added in order to maintain the internal pressure at 0.42 MPaG so that the polymerization was continued, a fluoropolymer electrolyte emulsion having repeating units derived from $CF_2\!=\!CF_2$ and $CF_2\!=\!CF\!-\!O\!-\!(CF_2)_2\!-\!SO_3H$ with an EW of 548 was produced in the same manner as in Example 1. After 5 hours from the polymerization initiation, that is, at the time when 381 g in total of TFE was additionally introduced, the TFE was released from the pressure and the polymerization was stopped. Thereby, 4,328 g of a polymerization liquid (precursor emulsion) was obtained.

The precursor polymer obtained in the same manner as in Example 1 had an MFR of 7.2 g/10 min.

The fluoropolymer electrolyte emulsion contained 27.0 mol % of a repeating unit derived from the $SO_3H$ group-containing monomer of the fluoropolymer electrolyte. The fluoropolymer electrolyte had an average particle size of 47 nm and an aspect ratio of 1.0. The ratio (the number of $SO_2F$ groups)/(the number of $SO_3Z$ groups) was 0.

Thereafter, except that the obtained fluoroelectrolyte emulsion was used, a fluoropolymer electrolyte membrane and an electrode catalyst layer were produced in the same manner as in Example 1. The fluoropolymer electrolyte membrane had an EW of 548, a distance between ionic clusters of 2.4 nm, and ion conductivities of 0.10 S/cm at 110° C. and 35% RH and 0.13 S/cm at 110° C. and 50% RH. Further, the 25° C. water content was 90%. The platinum content of the electrode catalyst layer was 0.17 mg/cm$^2$ in an anode electrode and 0.32 mg/cm$^2$ in a cathode electrode. In the fuel cell evaluation performed in the same manner as in the step (1.10) of Example 1 except that the above electrolyte membrane was used, the current density was 0.49 A/cm$^2$ after the electrolyte membrane was maintained at a voltage of 0.6 V for 20 hours under the conditions of a cell temperature of 80° C. and the 50° C. saturated vapor pressure (corresponding to humidity 26% RH). Further, in the fuel cell evaluation performed in the same manner as in the step (1.11) of the example except that the above electrode catalyst layer was used, the current density was 0.45 A/cm$^2$ after the electrode catalyst layer was maintained at a voltage of 0.6 V for 20 hours under the conditions of a cell temperature of 80° C. and the 50° C. saturated vapor pressure (corresponding to humidity 26% RH).

Example 6

Except that the amount of $C_7F_{15}COONH_4$ was changed from 150 g to 60 g, the amount of $CF_2\!=\!CFOCF_2CF_2SO_2F$ was changed from 1,150 g to 958 g, the internal temperature was controlled to 38° C., and TFE was added in order to maintain the internal pressure at 0.53 MPaG so that the polymerization was continued, a fluoropolymer electrolyte emulsion having repeating units derived from $CF_2\!=\!CF_2$ and $CF_2\!=\!CF\!-\!O\!-\!(CF_2)_2\!-\!SO_3H$ with an EW of 579 was produced in the same manner as in Example 1. After 5 hours from the polymerization initiation, that is, at the time when 383 g in total of TFE was additionally introduced, the TFE was released from the pressure and the polymerization was stopped. Thereby, 4,343 g of a polymerization liquid (precursor emulsion) was obtained.

The precursor polymer obtained in the same manner as in Example 1 had an MFR of 2.8 g/10 min.

The fluoropolymer electrolyte emulsion contained 24.9 mol % of a repeating unit derived from the $SO_3H$ group-containing monomer of the fluoropolymer electrolyte. The fluoropolymer electrolyte had an average particle size of 78 nm and an aspect ratio of 1.0. The ratio (the number of $SO_2F$ groups)/(the number of $SO_3Z$ groups) was 0.

Thereafter, except that the obtained fluoroelectrolyte emulsion was used, a fluoropolymer electrolyte membrane and an electrode catalyst layer were produced in the same manner as in Example 1. The fluoropolymer electrolyte membrane had an EW of 579, a distance between ionic clusters of 2.5 nm, and ion conductivities of 0.10 S/cm at 110° C. and 40% RH and 0.12 S/cm at 110° C. and 50% RH. Further, the 25° C. water content was 80%. The platinum content in the electrode catalyst layer was 0.17 mg/cm$^2$ in an anode electrode and 0.32 mg/cm$^2$ in a cathode electrode. In the fuel cell evaluation performed in the same manner as in the step (1.10) of Example 1 except that the above electrolyte membrane was used, the current density was 0.47 A/cm$^2$ after the electrolyte membrane was maintained at a voltage of 0.6 V for 20 hours under the conditions of a cell temperature of 80° C. and the 50° C. saturated vapor pressure (corresponding to humidity 26% RH). Further, in the fuel cell evaluation performed in the same manner as in the step (1.11) of the example except that the above electrode catalyst layer was used, the current density was 0.42 A/cm$^2$ after the electrode catalyst layer was maintained at a voltage of 0.6 V for 20 hours under the conditions of a cell temperature of 80° C. and the 50° C. saturated vapor pressure (corresponding to humidity 26% RH).

Comparative Example 3

A fluoroelectrolyte having repeating units derived from $CF_2\!=\!CF_2$ and $CF_2\!=\!CF\!-\!O\!-\!(CF_2)_2\!-\!SO_3H$ with an EW of 705 was produced as follows.

A 6-L-capacity SUS316-made pressure-resistant container provided with a stirring wing and a temperature-controlling jacket was charged with water purified by reverse osmosis membrane (2,950 g), $C_7F_{15}COONH_4$ (60 g), and $CF_2\!=\!CFOCF_2CF_2SO_2F$ (180 g). The air inside the system was replaced with nitrogen, and then the container was evacuated. Subsequently, TFE was introduced therein until the internal pressure reached 0.2 MPaG. The temperature was controlled so that the internal temperature was 48° C. under stirring at 400 rpm, and $CF_4$ of 0.1 MPaG as an explosion inhibitor was introduced into the container. TFE was additionally introduced so that the internal pressure was 0.70 MPaG. Then, a solution of $(NH_4)_2S_2O_8$ (1.5 g) in water (20 g) was injected therein, so that polymerization was initiated. Thereafter, TFE was added so as to maintain the internal pressure at 0.70 MPaG. For every 10 g of TFE, 6.5 g of $CF_2\!=\!CFOCF_2CF_2SO_2F$ was added to continue the polymerization.

After 218 minutes from the polymerization initiation, that is, at the time when 774 g of TFE was additionally introduced, the TFE was released from the pressure and the polymerization was stopped. A 4,400-g portion of the obtained polymerization liquid (precursor emulsion) was mixed with water (4,400 g), and then mixed with nitric acid to be coagulated. The coagulated polymer was filtered. Re-dispersion in water and filtration was repeated 3 times. Then, the polymer was dried at 90° C. for 12 hours and subsequently at 120° C. for 12 hours using a hot-air drier. Thereby, 1,200 g of a polymer was obtained.

The obtained polymer (fluoropolymer electrolyte precursor) had an MFR of 3.5 g/10 min and contained 19 mol % of a repeating unit derived from the $SO_3H$ group-containing monomer.

Except that this polymer (fluoropolymer electrolyte precursor) was used, a fluoropolymer electrolyte solution and a fluoropolymer electrolyte membrane were produced and the EW, ion-cluster distance, and conductivity were measured in the same manner as in Comparative Example 1. As a result, the EW was 705 and the distance between ionic clusters was 2.7 nm. The conductivity was 0.08 S/cm at 110° C. and 50% RH; that is, a desired high conductivity was not achieved.

Except that the above fluoropolymer electrolyte membrane was used, an MEA was produced in the same manner as in the step (1.10) of Example 1, and the fuel cell evaluation was performed. As a result, the current density was 0.27 A/cm² after the MEA was maintained at a voltage of 0.6 V for 20 hours under the conditions of a cell temperature of 80° C. and the 50° C. saturated vapor pressure (corresponding to humidity 26% RH); that is, a high current density was not achieved.

Except that the fluoropolymer electrolyte solution was used, an electrode catalyst layer and an MEA were produced in the same manner as in the step (1.11) of Example 1, and the fuel cell evaluation was performed. As a result, the current density was 0.26 A/cm² after the MEA was maintained at a voltage of 0.6 V for 20 hours under the conditions of a cell temperature of 80° C. and the 50° C. saturated vapor pressure (corresponding to humidity 26% RH); that is, a high current density was not achieved.

Comparative Example 4

4.1

A 3,000-ml-capacity stainless-steel stirring autoclave was charged with a 10% aqueous solution of $C_7F_{15}COONH_4$ (300 g) and pure water (1,170 g). The autoclave was sufficiently evacuated and the inside air was replaced with nitrogen, and the autoclave was then sufficiently evacuated. Tetrafluoroethylene [TFE] gas was introduced therein so that the gauge pressure was 0.2 MPa, and the autoclave was heated up to 50° C. Thereafter, $CF_2$=$CFOCF_2CF_2SO_2F$ (100 g) was charged, and TFE gas was introduced therein so that the gauge pressure was raised to 0.7 MPa. A solution of ammonium persulfate [APS] (0.5 g) in pure water (60 g) was charged therein and polymerization was initiated.

In order to supply TFE consumed during the polymerization, TFE was continuously supplied to the autoclave so that the pressure was maintained at 0.7 MPa. $CF_2$=$CFOCF_2CF_2SO_2F$ in an amount corresponding to 0.53 times in mass ratio larger than that of the further supplied TFE was continuously supplied so that the polymerization was continued. At the time when 522 g in total of TFE was supplied, the pressure inside the autoclave was released and the polymerization was stopped. Thereafter, the autoclave was cooled down to room temperature. Thereby, 2,450 g of a slightly opaque precursor emulsion containing about 33% by mass of the fluoropolymer electrolyte precursor was obtained.

Part of the precursor emulsion was taken out and coagulated with nitric acid. Then, the coagulated product was washed with water and dried. The high-temperature NMR measurement showed that the fluoropolymer precursor contained 19 mol % of the fluorovinyl ether derivative units.

4.2

The precursor emulsion (50 ml) obtained in the step (4.1) was diluted 5-fold with pure water, and was stirred in a 500-ml-capacity beaker and the temperature was raised to 55° C. The pH was maintained at 10 or higher while 10% by mass of a sodium hydroxide aqueous solution was dropwise added, and —$SO_2F$ of the fluoropolymer precursor was hydrolyzed. Although reduction in the pH was no longer observed after about 3-hour hydrolysis, the hydrolysis was further continued for another 2 hours, and then stopped. No deposition of the fluoropolymer was visually observed during the hydrolysis.

4.3

The reaction solution obtained in the step (4.2) was mixed with 1 N hydrochloric acid, and thereby hydrolysis with acid was performed. Low-molecular-weight matter was removed and the fluoropolymer was purified and concentrated by centrifugal ultrafiltration using Centriprep YM-10 (Amicon). The obtained fluoroelectrolyte emulsion had a concentration of the fluoropolymer electrolyte of 43% by mass, and contained a fluoropolymer electrolyte having stable —$SO_3K$.

The fluoroelectrolyte emulsion was diluted 100-fold with pure water and dripped onto an aluminum plate. Then, the dripped emulsion was dried at 60° C. so that a sample for particle-shape measurement was prepared. The sample was measured using an atomic force microscope [AFM], and 20 particles within the obtained image were randomly selected out. The aspect ratio was 1.0 and the average particle size was 100 nm.

4.4

The fluoroelectrolyte emulsion obtained in the step (4.3) was mixed with an ethanol-isopropanol (1:1 in volume) mixed solution in a volume half of the emulsion, and thereby a dispersion composition for thin film formation was obtained. The dispersion composition for thin film formation was applied to a glass plate, and then dried at room temperature, so that a colorless transparent membrane was obtained. The obtained membrane was heated at 300° C. for 10 minutes, and thus immobilized, and then immersed in pure water so that the membrane was separated from the glass plate. Thereby, an electrolyte membrane was obtained. The obtained electrolyte membrane had a thickness of 12 to 17 μm. The EW measurement was performed on the obtained electrolyte membrane, and the EW was 705.

The obtained polymer (fluoropolymer electrolyte precursor) had an MFR of 3.5 g/10 min and contained 19 mol % of a repeating unit derived from the $SO_3H$ group-containing monomer.

Except that this polymer (fluoropolymer electrolyte precursor) was used, a fluoropolymer electrolyte solution and a fluoropolymer electrolyte membrane were produced and the EW, ion-cluster distance, and conductivity were measured in the same manner as in Comparative Example 1. As a result, the EW was 705 and the distance between ionic clusters was 2.7 nm. The conductivity was 0.08 S/cm at 110° C. and 50% RH; that is, a desired high conductivity was not achieved.

INDUSTRIAL APPLICABILITY

The electrolyte emulsion of the present invention enables to easily provide a fuel cell having high performance even under high-temperature and low-humidity conditions at low cost. The electrolyte emulsion of the present invention may be used for various fuel cells including direct methanol-type fuel cells, electrolysis of water, electrolysis of halogenated hydroacids, electrolysis of common salt, oxygen concentrators, humidity sensors, and gas sensors.

The invention claimed is:

1. A membrane electrode assembly comprising:
an electrolyte membrane,
wherein the electrolyte membrane is obtained by a production method which comprises:
(1) applying an electrolyte emulsion to a substrate;
(2) drying the electrolyte emulsion applied to the substrate to provide an electrolyte membrane; and
(3) peeling the electrolyte membrane off from the substrate,
wherein the electrolyte emulsion applied to the substrate comprises:
(i) an aqueous medium; and
(ii) a fluoropolymer electrolyte dispersed in the aqueous medium,
wherein the fluoropolymer electrolyte dispersed in the aqueous medium comprises:
(a) ionic clusters that are 0.1 to 2.6 nm apart at 25° C. and relative humidity 50% RH as calculated by small angle X-ray measurement based on the following formula(I):

$$d=\lambda/2/\sin(\theta m) \qquad (I)$$

wherein d is a distance between ionic clusters, λ, is an incident X-ray wavelength used in the small angle X-ray measurement, and θm is a Bragg angle which indicates a peak; and
(b) a monomer unit that has an $SO_3Z$ group, wherein Z is an alkali metal, an alkaline-earth metal, hydrogen, or $NR^1R^2R^3R^4$, wherein $R^1$, $R^2$, $R^3$, and $R^4$ each are individually a C1-C3 alkyl group or hydrogen,
wherein the electrolyte has an equivalent weight (EW) of 250 or more and 700 or less, a proton conductivity of 0.1 S/cm or higher when measured at 110° C. and relative humidity 50% RH, and a ratio (the number of $SO_2F$ groups)/(the number of $SO_3Z$ groups) of 0 to 0.01, and the electrolyte being a spherical particulate substance having an average particle size of 10 to 500 nm.

2. A membrane electrode assembly comprising:
an electrode catalyst layer,
wherein the electrode catalyst layer is obtained by a production method which comprises:
(1) dispersing composite particles comprising a catalyst metal and a conductive agent in an electrolyte emulsion to prepare an electrode catalyst composition;
(2) applying the electrode catalyst composition to a substrate; and
(3) drying the electrode catalyst composition applied to the substrate to provide an electrode catalyst layer,
wherein the electrolyte emulsion comprises:
(i) an aqueous medium; and
(ii) a fluoropolymer electrolyte dispersed in the aqueous medium,
wherein the fluoropolymer electrolyte comprises
(a) ionic clusters that are 0.1 to 2.6 nm apart at 25° C. and relative humidity 50% RH as calculated by small angle X-ray measurement based on the following formula(I):

$$d=\lambda/2/\sin(\theta m) \qquad (I)$$

wherein d is a distance between ionic clusters, λ, is an incident X-ray wavelength used in the small angle X-ray measurement, and θm is a Bragg angle which indicates a peak; and
(b) a monomer unit that has an $SO_3Z$ group, wherein Z is an alkali metal, an alkaline-earth metal, hydrogen, or $NR^1R^2R^3R^4$, wherein $R^1$, $R^2$, $R^3$, and $R^4$ each are individually a C1-C3 alkyl group or hydrogen,
wherein the electrolyte has an equivalent weight (EW) of 250 or more and 700 or less, a proton conductivity of 0.1 S/cm or higher when measured at 110° C. and relative humidity 50% RH, and a ratio (the number of $SO_2F$ groups)/(the number of $SO_3Z$ groups) of 0 to 0.01, and the electrolyte being a spherical particulate substance having an average particle size of 10 to 500 nm.

3. A polymer electrolyte fuel cell, comprising the membrane electrode assembly according to claim 1.

4. A polymer electrolyte fuel cell, comprising the membrane electrode assembly according to claim 2.

5. A membrane electrode assembly comprising:
an electrolyte membrane comprising,
ionic clusters that are 0.1 to 2.6 nm apart at 25° C. and relative humidity 50% RH as calculated by small angle X-ray measurement based on the following formula (I):

$$d=\lambda/2/\sin(\theta m) \qquad (I)$$

wherein d is a distance between ionic clusters, λ is an incident X-ray wavelength used in the small angle X-ray measurement, and θm is a Bragg angle which indicates a peak; and
a polymer comprising a monomer unit that has an $SO_3Z$ group, wherein Z is an alkali metal, an alkaline-earth metal, hydrogen, or $NR^1R^2R^3R^4$, wherein $R^1$, $R^2$, $R^3$, and $R^4$ each are individually a C1-C3 alkyl group or hydrogen;
wherein the polymer has an equivalent weight (EW) of 250 or more and 700 or less, a proton conductivity of 0.1 S/cm or higher when measured at 110° C. and relative humidity 50% RH, a ratio (the number of $SO_2F$ groups)/(the number of $SO_3Z$ groups) of 0 to 0.01, and a spherical particulate substance having an average particle size of 10 to 500 nm.

6. A membrane electrode assembly comprising:
an electrode catalyst layer, said electrode catalyst layer comprising,
composite particles comprising a catalyst metal and a conductive agent;
ionic clusters that are 0.1 to 2.6 nm apart at 25° C. and relative humidity 50% RH as calculated by small angle X-ray measurement based on the following formula (I):

$$d=\lambda/2/\sin(\theta m) \qquad (I)$$

wherein d is a distance between ionic clusters, λ is an incident X-ray wavelength used in the small angle X-ray measurement, and θm is a Bragg angle which indicates a peak; and
a polymer comprising a monomer unit that has an $SO_3Z$ group, wherein Z is an alkali metal, an alkaline-earth metal, hydrogen, or $NR^1R^2R^3R^4$, wherein $R^1$, $R^2$, $R^3$, and $R^4$ each are individually a C1-C3 alkyl group or hydrogen;
wherein the polymer has an equivalent weight (EW) of 250 or more and 700 or less, a proton conductivity of 0.1 S/cm or higher when measured at 110° C. and relative humidity 50% RH, a ratio (the number of $SO_2F$ groups)/

(the number of SO$_3$Z groups) of 0 to 0.01, and a spherical particulate substance having an average particle size of 10 to 500 nm.

7. A polymer electrolyte fuel cell, comprising the membrane electrode assembly according to claim 5.

8. A polymer electrolyte fuel cell, comprising the membrane electrode assembly according to claim 6.

* * * * *